US008792488B2

(12) United States Patent
Ohno

(10) Patent No.: US 8,792,488 B2
(45) Date of Patent: Jul. 29, 2014

(54) NETWORK SWITCH, ROUTE SETUP METHOD, PROGRAM, AND PARALLEL COMPUTER SYSTEM

(75) Inventor: Yoshiyuki Ohno, Tokyo (JP)

(73) Assignee: NEC Corporation, Tokyo (JP)

( * ) Notice: Subject to any disclaimer, the term of this patent is extended or adjusted under 35 U.S.C. 154(b) by 487 days.

(21) Appl. No.: 13/258,892

(22) PCT Filed: Mar. 10, 2010

(86) PCT No.: PCT/JP2010/053993
§ 371 (c)(1),
(2), (4) Date: Sep. 22, 2011

(87) PCT Pub. No.: WO2010/125859
PCT Pub. Date: Nov. 4, 2010

(65) Prior Publication Data
US 2012/0020356 A1  Jan. 26, 2012

(30) Foreign Application Priority Data
Apr. 28, 2009 (JP) ................................. 2009-109587

(51) Int. Cl.
*H04L 12/28* (2006.01)

(52) U.S. Cl.
USPC ........................................................ 370/390

(58) Field of Classification Search
CPC ... H04L 49/30; H04L 12/2872; H04L 19/254;
H04L 45/42; H04L 49/254; H04L 12/2894;
H04L 12/403; H04L 49/102; H04L 12/423;
H04L 45/16; H04Q 11/471
USPC .................. 370/419, 421–424, 432
See application file for complete search history.

(56) References Cited

U.S. PATENT DOCUMENTS

2009/0290585 A1* 11/2009 Deng ............................ 370/390

FOREIGN PATENT DOCUMENTS

| JP | 5-28122 A | 2/1993 |
|---|---|---|
| JP | 6-261045 A | 9/1994 |
| JP | 7-200505 A | 8/1995 |
| JP | 8-305649 A | 11/1996 |
| JP | 2581286 B | 2/1997 |
| JP | 9-297746 A | 11/1997 |
| JP | 2000216787 A | 8/2000 |
| JP | 2001202343 A | 7/2001 |
| JP | 2004533035 A | 10/2004 |

OTHER PUBLICATIONS

International Search Report for PCT/JP2010/053993 mailed Apr. 20, 2010.
F. Petrini et al., "Hardware- and Software-Based Collective Communication on the Quadrics Network", Proceedings of NCA2001, 2001.
A. Nakajima, "Two-Stage Mutual Multicast for n-to-n Communication", The Transaction of IEICE, vol. J75-D-I, No. 1, Jan. 25, 1992, pp. 19-29.

\* cited by examiner

*Primary Examiner* — Kwang B Yao
*Assistant Examiner* — Syed M Bokhari
(74) *Attorney, Agent, or Firm* — Sughrue Mion, PLLC

(57) ABSTRACT

A network switch that outputs multicast packets from a plurality of output ports correlated with a plurality of input ports. A multicast control section designates an input port that has received a route setup command and an output port that outputs the route setup command to be transferred to a destination designated by the route setup command as ports that output the multicast packets. In multicast communications, the multicast packets are transferred to ports other than the input port that has received the multicast packets of the ports designated by a multicast section as those that output the multicast packet.

25 Claims, 14 Drawing Sheets

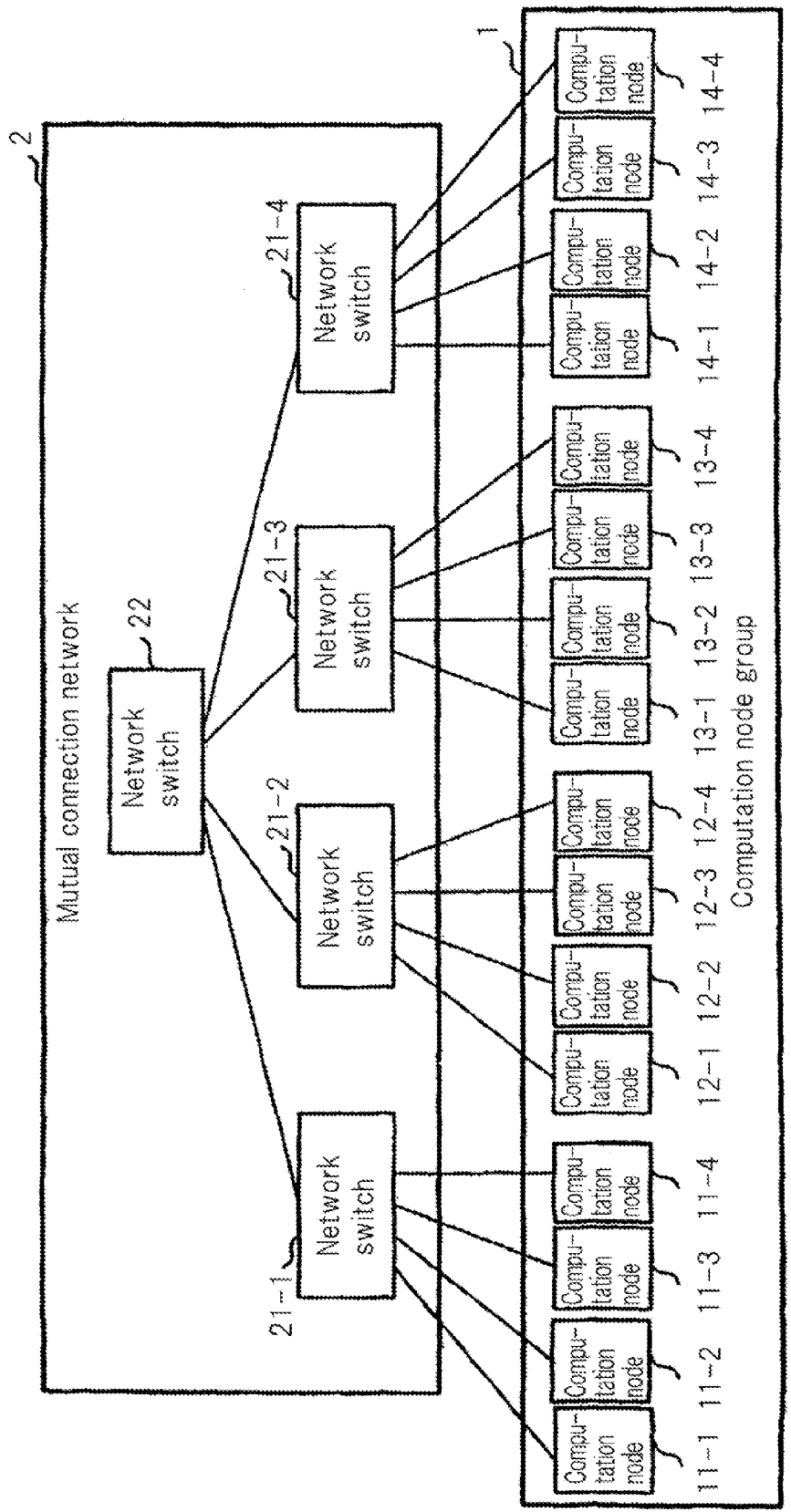

Fig.2

Unicast packet

| Command information (00) | Destination information (4 bits) | Data section |
|---|---|---|

Route setup command

| Command information (01) | Multicast ID (4 bits) | Destination information (6 bits) | Group member process count (6 bits) | Blank |
|---|---|---|---|---|

Setup completion notification

| Command information (10) | Multicast ID (4 bits) | Blank |
|---|---|---|

Multicast packet

| Command information (11) | Multicast ID (4 bits) | Data section |
|---|---|---|

Fig.5

Multicast control information 3051

| Multicast ID | Output port 01 | Output port 02 | Output port 03 | Output port 04 | Output port 05 | |
|---|---|---|---|---|---|---|
| 0 | 1 | 0 | 0 | 0 | 0 | B0 |
| 1 | | | | | | B1 |
| ⋮ | | ⋮ | | | | |
| 15 | | | | | | B15 |

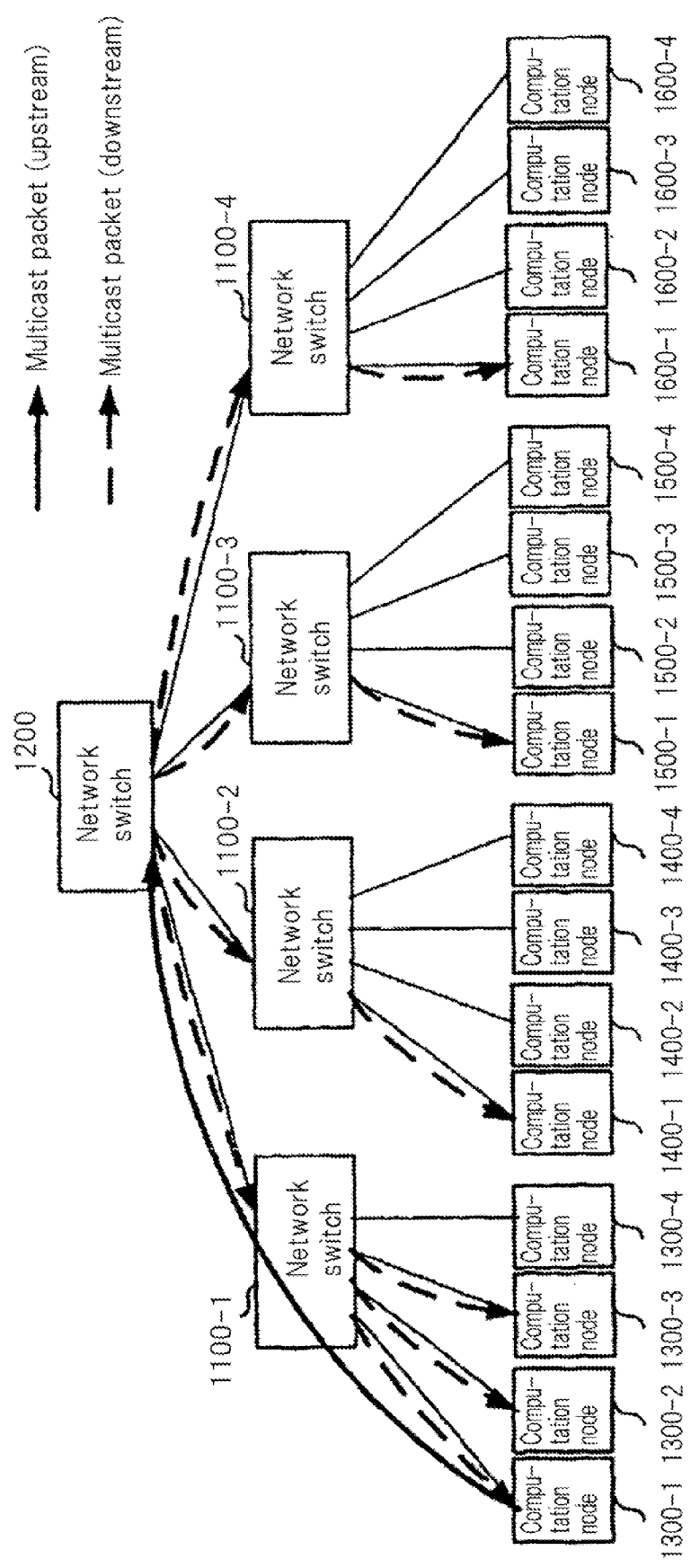

NETWORK SWITCH, ROUTE SETUP METHOD, PROGRAM, AND PARALLEL COMPUTER SYSTEM

TECHNICAL FIELD

The present invention relates to a network switch, a route setup method, a program, and a parallel computer system.

BACKGROUND ART

Generally, parallel computer systems in which a plurality of computation nodes are connected through a mutual connection network are used to process large scale problems at high speed. In these parallel computer systems, a plurality of nodes share computations associated with processes for target problems. At this point, data necessary for computations and their resultant computation data need to be mutually exchanged between computation nodes. Thus, data are transferred from one computation node to another computation node through the mutual connection network.

When packets that contain the same data are transmitted from one computation node to a plurality of computation nodes, the objective can be achieved in such a manner that the same packets are successively transmitted from the source computation node to different destination computation nodes. However, if the mutual connection network is provided with a function that copies a packet with which data are transferred and transmits the copied packets to a plurality of computation nodes, the load that the source computation node imposes on the mutual connection network can decrease and thereby shorten the data transfer time. The activity that transmits the same data from one computation node to a plurality of computation nodes is referred to as the multicast communication function.

The MPI (Message Passing Interface) in which is known as an ordinary form that describes a program executed on a parallel computer manages a set of processes that communicate with each other as a communicator and is provided with a plurality of functions that perform multicast communications with processes contained in the communicator.

For example, "MPI_Bcast" that the MPI defines is a function that transmits data that a particular process stores to all processes contained in the same communicator. Although this communicator may designate a set of processes of the whole system, it may specify a subset of processes. On the other hand, "MPI_Allgather" is a function that transmits designated data from any process contained in the communicator to all the processes contained in the same communicator.

Although the activities that functions such as "MPI_Bcast" and "MPI_Allgather" perform the multicast communications can be accomplished by executing a unicast communication that is a one-to-one communication a plurality of number of times, if the mutual connection network is provided with an activity that copies a packet and transmits the copied packets to a plurality of computation nodes, it is preferred to use this activity with which the mutual communication network is provided. This means that the data transfer time can be shortened and the execution performance of the entire program can be improved.

Various techniques that reduce the data transfer time and improve the execution performance for the entire program have been proposed.

For example, Non-patent Literature 1 discloses a mutual connection network that is provided with a multicast communication activity. In this technique, network switches 1100-1 to 1100-4 and network switch 1200 shown in FIG. 14 are connected such that a tree-structure network is formed. In addition, computation nodes 1300-1 to 1300-4 and network switch 1100-1 are connected; computation nodes 1400-1 to 1400-4 and network switch 1100-2 are connected; computation nodes 1500-1 to 1500-4 and network switch 1100-3 are connected; and computation nodes 1600-1 to 1600-4 and network switch 1100-4 are connected. In this case, a multicast packet transmitted from computation node 1300-1 is transmitted to a particular network switch such as network switch 1200 that has been designated as its destination and that is the root of the network structure through network switch 1100-1. Network switch 1200 that has been designated as the destination always receives multicast packets. Then, network switch 1200 transfers the multicast packets to individual computation nodes contained in the process group that performs multicast communications based on communication route information that designates the multicast packets to be transferred.

RELATED ART LITERATURE

Non-Patent Literature

Non-patent Literature 1: "Hardware- and Software-Based Collective Communication on the Quadrics Network", Proceedings of NCA 2001.

SUMMARY OF THE INVENTION

Problem to be Solved by the Invention

According to the technique disclosed as Non-patent Literature 1, as shown in FIG. 14, multicast packets go and come back between network switch 1100-1 and network switch 1200. Thus, multicast packets pass through network switch 1100-1 twice in the upstream and downstream directions and thereby a problem in which the network cannot be effectively used arises.

The present invention aims at providing a network switch, a route setup method, a program, and a parallel computer system that solve the above-described problem.

Means that Solve the Problem

To solve the above-described problem, a network switch according to the present invention is a network switch that has a plurality of input ports and a plurality of output ports correlated with the input ports and that outputs multicast packets from said output ports, comprising: a multicast control information storing section that stores multicast control information that is information that designates an output port that outputs said multicast packet from said plurality of output ports; and a multicast control section that causes said multicast control information storing section to set up a transfer route of said multicast packet, wherein said multicast control section designates an output port correlated with an input port that has received a route setup command that causes the network switch to set up a transfer route and an output port that outputs the route setup command as output ports that transfer said multicast packet such that the route setup command reaches a destination designated by the route setup command when the multicast control section receives the route setup command and the multicast control section outputs the multicast packets to output ports other than the output port correlated with the input port that has received the multicast packet of the output ports designated by the multicast control information stored in said multicast control information storing section when said multicast control section receives the multicast packet.

To solve the above-described problem, a route setup method according to the present invention is a multicast route setup method for a network switch that has a plurality of input ports and a plurality of output ports correlated with the input ports and that outputs multicast packets from said output ports, comprising: a multicast control information storing process that stores multicast control information that is information that designates an output port that outputs said multicast packet from said plurality of output ports; a multicast control process that causes said multicast control information storing process to set up a transfer route of said multicast packet, said multicast control process designating an output port correlated with an input port that has received a route setup command that causes the network switch to set up a transfer route and an output port that outputs the route setup command as output ports that transfer said multicast packet such that the route setup command reaches a destination designated by the route setup command when the network switch receives the route setup command; and a multicast transfer process that outputs the multicast packets to output ports other than the output port correlated with the input port that has received the multicast packet of the output ports designated by the multicast control information stored in said multicast control information storing process when the network switch receives the multicast packet.

In addition, a program that causes a computer, a parallel computer system, to execute procedures comprising: a multicast control information storing procedure that stores multicast control information that is information that designates an output port that outputs a multicast packet from a plurality of output ports, a network switch that has a plurality of input ports and said plurality of output ports correlated with the input ports; a multicast control procedure that causes said multicast control information storing procedure to set up a transfer route of said multicast packet, said multicast control procedure designating an output port correlated with an input port that has received a route setup command that causes the network switch to set up a transfer route and an output port that outputs the route setup command as output ports that transfer said multicast packet such that the route setup command reaches a destination designated by the route setup command when the network switch receives the route setup command; and a multicast transfer procedure that outputs the multicast packets to output ports other than the output port correlated with the input port that has received the multicast packet of the output ports designated by the multicast control information stored in said multicast control information storing procedure when the network switch receives the multicast packet.

Effect of the Invention

According to the present invention, the network can be effectively used.

BRIEF DESCRIPTION OF DRAWINGS

FIG. 1 is a schematic diagram showing a structure of a parallel computer system according to an exemplary embodiment of the present invention.

FIG. 2 is a schematic diagram showing an exemplary data structure of a unicast packet, an exemplary data structure of a route setup command, an exemplary data structure of a setup completion notification, and an exemplary data structure of a multicast packet.

FIG. 5 is a schematic diagram showing an exemplary data structure of multicast control information.

FIG. 14 is a schematic diagram showing an exemplary flow of multicast packets transmitted in a tree structure network that is provided with multicast activity, and that is disclosed in Non-patent Literature 1.

CARRYING OUT THE INVENTION

Figure 3:
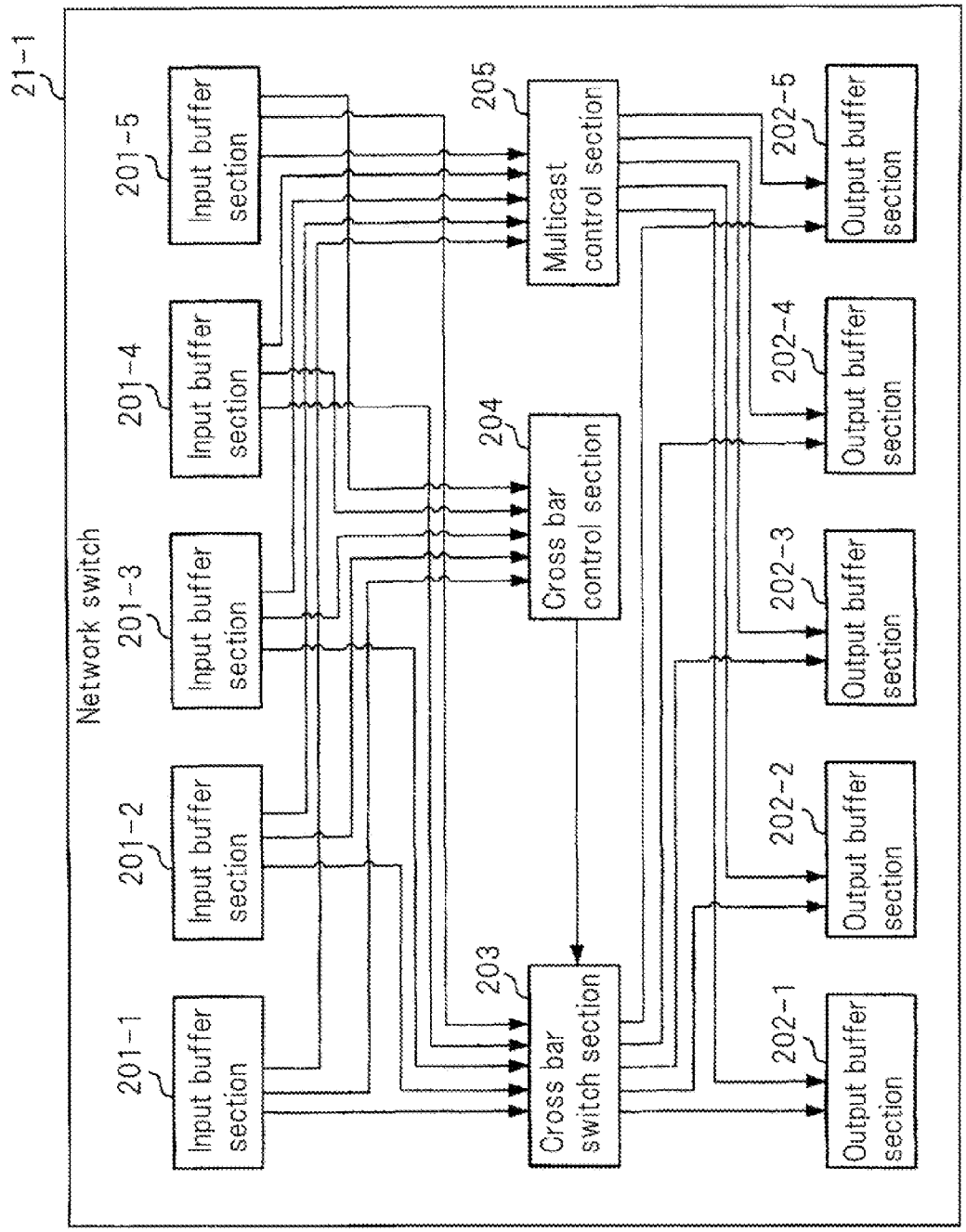
FIG. 3 is a schematic diagram showing a structure of a network switch shown in FIG. 1.

In the following, a parallel computer system (including a network switch, a route setup method, and a program) according to an exemplary embodiment of the present invention will be described.

First, with reference to FIG. 1, the structure of the parallel computer system according to this exemplary embodiment will be described. As shown in FIG. 1, the parallel computer system is composed of computation node group 1 and mutual connection network 2.

Computation nodes 11-1 to 11-4, 12-1 to 12-4, 13-1 to 13-4, and 14-1 to 14-4 contained in computation node group 1 are mutually connected to mutual connection network 2.

Mutual connection network 2 is composed of a plurality of network switches 21-1 to 21-4 and 22. The form of mutual connection network 2 can be arbitrary. For example, mutual connection network 2 may be a multi-stage connection network. According to this exemplary embodiment, mutual connection network 2 is a tree-structure network.

Network switches 21-1 to 21-4 and 22 are respectively assigned "switch identification information" that uniquely identifies network switches 21-1 to 21-4 and 22.

Network switches 21-1 to 21-4 are directly connected to computation node group 1. Likewise, network switch 22 is mutually connected to network switches 21-1 to 21-4. A plurality of network switches 22 may be provided.

Computation nodes 11-1 to 11-4, 12-1 to 12-4, 13-1 to 13-4, and 14-1 to 14-4 each are independent "terminals" that are provided with an arithmetic unit and a memory.

Processes that execute predetermined processing operations including arithmetic processing operations associated with a problem that the parallel computer system solves operate in computation nodes 11-1 to 11-4, 12-1 to 12-4, 13-1 to 13-4, and 14-1 to 14-4. In this exemplary embodiment, the case in which one process operates in each of computation nodes 11-1 to 11-4, 12-1 to 12-4, 13-1 to 13-4, and 14-1 to 14-4 will be described.

In addition, computation nodes 11-1 to 11-4, 12-1 to 12-4, 13-1 to 13-4, and 14-1 to 14-4 generate multicast packets transmitted to a plurality of particular destinations.

Multicast packets contain multicast IDs that are "group identification information" uniquely assigned to a "process group" composed of computation nodes that execute multicast communications. An example of a process group is a communicator treated as a set of processes that perform communications for MPI communications.

Computation nodes each store group identification information of a process group that contains processes that operate in the computation nodes. The group identification information can be arbitrary as long as it can uniquely identify a process group.

A computation node that transmits a multicast packet of computation nodes 11-1 to 11-4, 12-1 to 12-4, 13-1 to 13-4, and 14-1 to 14-4 generates "a route setup command" that sets up a route through which the multicast packet is transferred and transmits the route setup command to a multicast control switch.

In this instance, a "multicast control switch" is a network switch that controls the transfer of a multicast packet.

According to this exemplary embodiment, network switches 21-1 to 21-4 and 22 each transfer a multicast packet transmitted from a particular computation node to all computation nodes, other than a source computation node, of a process group.

One of network switches 21-1 to 21-4 and 22 is designated as a multicast control switch for every process group.

In this exemplary embodiment, the case in which processes that operate in computation nodes 11-1 to 11-4, 12-1 to 12-4, 13-1 to 13-4, and 14-1 to 14-4 transmit route setup commands that designate network switch 22 as a multicast control switch will be exemplified.

Next, with reference to FIG. 2, packet data that are transmitted in the parallel computer system according to this exemplary embodiment will be described.

The parallel computer system according to this exemplary embodiment handles four types of "packet data" that are a unicast packet, a route setup command, a setup completion notification, and a multicast packet. In the following, the case in which these packet data are 32-bit packet data will be exemplified.

These four types of packet data can be identified as a unicast packet, a route setup command, a setup completion notification, and a multicast packet based on command information assigned to their leading two bits.

A unicast packet is packet data that are transmitted and received through one-to-one communication performed between one particular computation node and another computation node of computation nodes 11-1 to 11-4, 12-1 to 12-4, 13-1 to 13-4, and 14-1 to 14-4.

According to this exemplary embodiment, a unicast packet is composed of two-bit command information "00," four-bit destination information that uniquely identifies a transmission destination computation node, and 26-bit remaining data portion.

As described above, a "route setup command" is packet data that sets up a route through which a multicast packet is transferred.

According to this exemplary embodiment, a route setup command includes two-bit command information "01," a four-bit multicast ID, six-bit "designation information," and a six-bit "group member process count."

The "destination information" is information that represents the destination of the route setup command. According to this exemplary embodiment, the same information as switch identification information assigned to a network switch that is a multicast control switch is designated as the destination information.

The "group member process count" is the number of computation nodes in which processes contained in a particular process group operate. If single processes that operate in computation nodes 11-1, 11-2, 12-1, 13-1, and 14-1 are members of the same process group, the group member process count is "5."

Each of computation nodes that perform multicast communications and that are members of the same process group generate a route setup command. Thus, computation nodes 11-1 to 11-4, 12-1 to 12-4, 13-1 to 13-4, and 14-1 to 14-4 that contain these processes have stored a multicast ID, destination information, and a group member process count that are written into a route setup command.

When a transfer route of a multicast packet has been set up, the multicast control switch generates a "setup completion notification" and is a "reply signal to the route setup command" that denotes that the transfer route has been set up.

According to this exemplary embodiment, a setup completion notification includes two-bit command information "10" and a four-bit multicast ID.

A setup completion notification is transmitted to computation nodes contained in a process group that is identified by the multicast ID contained in the setup completion notification through a network switch associated with multicast communications of the process group.

A multicast packet is "packet data for which multicast communications are performed."

According to this exemplary embodiment, a multicast packet is composed of two-bit command information "11", a four-bit multicast ID, and a 26-bit data section.

A multicast packet transmitted from a computation node that has received a setup completion notification reaches all processes contained in a process group represented by the multicast ID contained in the multicast packet. In other words, a plurality of routes can be set up in multicast communications and multicast communications themselves can be executed in parallel based on multicast IDs that are indexed.

According to this exemplary embodiment, although above-described four types of packets are transmitted and received in the parallel computer system, other types of packet data can be present. In addition, the format of packet data (size of packet data, control information, and so forth) is not limited to the example shown in FIG. 2, but can be arbitrary.

Next, with reference to FIG. 3, the structure of network switches 21-1 to 21-4 and 22 will be described. Since the structure of each of network switches 21-1 to 21-4 and 22 is the same, the structure of network switch 21-1 will be exemplified in the following.

As shown in FIG. 3, network switch 21-1 has input buffer sections 201-1 to 201-5, output buffer sections 202-1 to 202-

5, cross bar switch section 203, cross bar control section 204, and multicast control section 205.

Cross bar switch section 203 and multicast control section 205 each have a plurality of input ports and a plurality of output ports. The number of input ports and the number of output ports can be arbitrary. In this exemplary description, cross bar switch section 203 and multicast control section 205 of each of network switches 21-1 to 21-4 and 22 have five input ports and five output ports (hereinafter referred to as 5-input, 5-output).

In this exemplary embodiment, the case in which input ports and output ports of each of network switches 21-1 to 21-4 and 22 are correlated, and in which the input ports are assigned numbers 1 to 5, and the output ports are assigned numbers 1 to 5, will be exemplified. For instance, the first input port is correlated with the first output port. The method that correlates input ports with output ports can be an ordinary method.

In the example shown in FIG. 1, the first to fourth input ports of five input ports of each of network switches 21-1 to 21-4 and 22 are connected in the upstream direction (in the direction from network switches 21-1 to 21-4 to network switch 22) shown in FIG. 1. In contrast, the first to fourth output ports of five output ports of each of network switches 21-1 to 21-4 and 22 are connected in the downstream direction (in the direction from network switch 22 to network switches 21-1 to 21-4) shown in FIG. 1. On the other hand, the fifth input port and the fifth output port of network switch 22 are unused. In contrast, the fifth input port of each of network switches 21-1 to 21-4 is connected in the downstream direction shown in FIG. 1. Likewise, the fifth output port of each of network switches 21-1 to 21-4 is connected in the upstream direction shown in FIG. 1.

Figure 4:
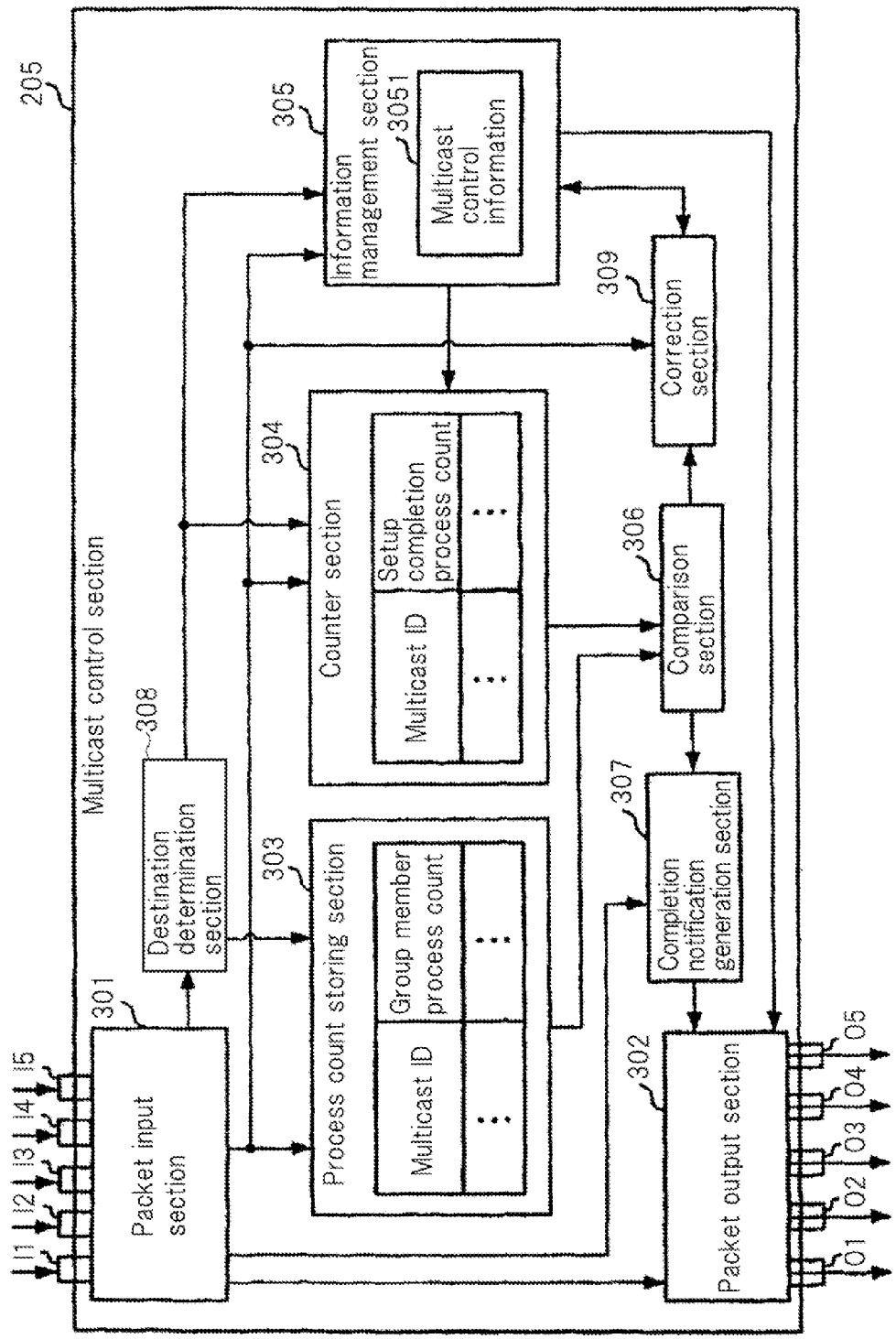
FIG. 4 is a schematic diagram showing a structure of a multicast control section shown in FIG. 3.

According to this exemplary embodiment, input buffer sections 201-1 to 201-5 are connected to input ports I1 to I5 of multicast control section 205 shown in FIG. 4, respectively.

According to this exemplary embodiment, input buffer sections 201-1 to 201-5 are connected to five input ports (not shown) of cross bar switch section 203 and five input ports (not shown) of cross bar control section 204, respectively.

When a packet is transmitted from the outside to input buffer sections 201-1 to 201-5, they identify whether the packet is a unicast packet, a route setup command, a setup completion notification, or a multicast packet based on the command information contained in the packet. Input buffer sections 201-1 to 201-5 output the packet transmitted from the outside to cross bar switch section 203 or multicast control section 205 depending on the identified packet type.

More specifically, when input buffer sections 201-1 to 201-5 identify the packet transmitted from the outside as a unicast packet, they output the unicast packet to cross bar switch section 203.

When input buffer sections 201-1 to 201-5 identify the packet transmitted from the outside as either a route setup command, a setup completion notification, or a multicast packet, they output the identified packet (either a route setup command, a setup completion notification, or a multicast packet) to multicast control section 205.

According to this exemplary embodiment, output buffer sections 202-1 to 202-5 are connected to output ports O1 to O5 of multicast control section 205 shown in FIG. 4, respectively.

In addition, according to this exemplary embodiment, output buffer sections 202-1 to 202-5 are connected to five output ports (not shown) of cross bar switch section 203, respectively.

When a unicast packet is output from output ports (not shown) of cross bar switch section 203 connected to output buffer sections 202-1 to 202-5, they output the unicast packet to network switch 22 and computation nodes 11-1 to 11-4 connected to output buffer sections 202-1 to 202-5.

When a route setup command, a setup completion notification, or a multicast packet is output from output ports O1 to O5 of multicast control section 205 connected to output buffer sections 202-1 to 202-5, respectively, output buffer sections 202-1 to 202-5 output the route setup command, the setup completion notification, or the multicast packet to network switch 22 and computation nodes 11-1 to 11-4 connected to output buffer sections 202-1 to 202-5.

Cross bar switch section 203 outputs the unicast packet that is output from input buffer sections 201-1 to 201-5 to output buffer sections 202-1 to 202-5 concerning which cross bar switch section 203 has been notified by cross bar control section 204.

Cross bar control section 204 identifies output buffer sections 202-1 to 202-5 connected to a transmission destination represented by destination information contained in the unicast packet that is output from input buffer sections 201-1 to 201-5 and notifies cross bar switch section 203 of an output buffer to which the unicast packet is to be output.

Multicast control section 205 outputs the multicast packet that is output from input buffer sections 201-1 to 201-5 from an output port that has been set up for the multicast packet. At this point, multicast control section 205 does not output the multicast packet from an output port correlated with an input port connected to an input buffer section that has output the multicast packet.

In the following, with reference to FIG. 4, the structure of multicast control section 205 will be described in detail. As shown in FIG. 4, multicast control section 205 has packet input section 301, packet output section 302, process count storing section 303, counter section 304, information management section 305, comparison section 306, completion notification generation section 307, destination determination section 308, and correction section 309.

Packet input section 301 outputs packet data (either a multicast packet, a route setup command, or a setup completion notification) that are output from input buffer sections 201-1 to 201-5 that are connected to input ports I1 to I5, respectively, to packet output section 302.

In addition, packet input section 301 identifies the packet data as a multicast packet, a route setup command, or a setup completion notification based on the command information contained in the packet data that are output from input buffer sections 201-1 to 201-5.

First, the operation in the case in which packet input section 301 identifies packet data that are output from input buffer sections 201-1 to 201-5 as a route setup command will be described.

In this case, packet input section 301 outputs destination information contained in the route setup command that is output from input buffer sections 201-1 to 201-5 to destination determination section 308.

In addition, packet input section 301 outputs a multicast ID and a group member process count contained in the route setup command to process count storing section 303.

In addition, packet input section 301 outputs the multicast ID contained in the route setup command to counter section 304.

In addition, packet input section 301 outputs command information "01" and the multicast ID contained in the route setup command and information that represents an input port that has input the route setup command to information management section 305.

In addition, packet input section 301 outputs the multicast ID contained in the route setup command to completion notification generation section 307.

Next, the operation in the case in which packet input section 301 identifies packet data that are output from input buffer sections 201-1 to 201-5 as a setup completion notification will be described.

In this case, packet input section 301 outputs a multicast ID contained in the setup completion notification that is output from input buffer sections 201-1 to 201-5 and information that represents an input port that has input the setup completion notification to correction section 309.

In addition, packet input section 301 outputs the multicast ID contained in the setup completion notification to process count storing section 303.

In addition, packet input section 301 outputs command information "10" and the multicast ID contained in the setup completion notification to counter section 304.

In addition, packet input section 301 outputs the multicast ID contained in the setup completion notification to completion notification generation section 307.

Next, the operation in the case in which packet input section 301 identifies packet data that are output from input buffer sections 201-1 to 201-5 as a multicast packet will be described.

In this case, packet input section 301 outputs command information "11" and a multicast ID contained in the multicast packet that is output from input buffer sections 201-1 to 201-5 to information management section 305.

In addition, packet input section 301 outputs information that represents an input port that has input the multicast packet to packet output section 302.

Packet output section 302 outputs the multicast packet that is output from packet input section 301 from output ports O1 to O5 connected to output buffer sections 202-1 to 202-5, respectively, based on multicast control information 3051 that represents an output port that outputs the multicast packet and that has been output from information management section 305.

More specifically, packet output section 302 outputs the multicast packet that is output from packet input section 301 from an output port corresponding to a bit that has been set to "1" of a bit sequence that is output from information management section 305. At this point, packet output section 302 does not output the multicast packet from an output port correlated with an input port that is represented by the information that is output from packet input section 301 and that has input the multicast packet.

In addition, packet output section 302 outputs the route setup command to an output port connected to a network switch that has been assigned switch identification information that is the same as the destination information concerning which packet output section 302 is notified by information management section 305.

In addition, packet output section 302 outputs the setup completion notification that is output from completion notification generation section 307 to output buffer sections 202-1 to 202-5 based on multicast control information 3051 that represents an output port that outputs the multicast packet and that has been output from information management section 305. In other words, packet output section 302 transmits the setup completion notification to the destination through an output port that is the same as an output port that outputs the multicast packet.

More specifically, packet output section 302 outputs the setup completion notification that is output from packet input section 301 to an output port corresponding to a bit that has been set to "1" of a bit sequence that is output from information management section 305.

Process count storing section 303 is a register group that correlatively stores the multicast ID that is output from packet input section 301 and the group member process count.

In addition, when process count storing section 303 is notified by destination determination section 308 that the destination of the route setup command is network switch 21-1, process count storing section 303 outputs the group member process count stored in correlation with the multicast ID that is output from packet input section 301 to comparison section 306.

In addition, when a multicast ID is output from packet input section 301 to process count storing section 303, it outputs a group member process count stored in correlation with the multicast ID to comparison section 306.

Counter section 304 obtains the setup completion process count and correlatively stores the obtained setup completion process count and the multicast ID that is output from packet input section 301.

In this instance, the setup completion process count is the "number of processes that information management section 305 has set up for communication routes" according to one route setup command that one computation node generates.

According to this exemplary embodiment, whenever counter section 304 is notified by information management section 305 that it has set up a bit, counter section 304 adds "1" to the setup completion process count stored in correlation with a multicast ID that is output from packet input section 301. The setup completion process count that is stored in counter section 304 is "0" unless an output port that outputs a multicast packet has been set up.

In addition, when counter section 304 is notified by destination determination section 308 that the designation of the route setup command is network switch 21-1, counter section 304 outputs the setup completion process count stored in correlation with the multicast ID that is output from packet input section 301 to comparison section 306.

In addition, when the command information "10" and the multicast ID are output form packet input section 301 to counter section 304, it outputs the command information "10" and the setup completion process count stored in correlation with the multicast ID to comparison section 306.

Information management section 305 stores multicast control information 3051.

Multicast control information 3051 is information that designates an output port that has been set up for a communication route for multicast communications and that outputs a multicast packet.

As shown in FIG. 5, according to this exemplary embodiment, multicast control information 3051 correlatively stores 16 five-bit sequences B0 to B15 and multicast IDs "0" to "15".

In addition, according to this exemplary embodiment, five bits contained in each of bit sequences B0 to B15 are correlated with output ports O1 to O5, respectively.

In addition, according to this exemplary embodiment, information management section 305 sets a bit corresponding to an output port that outputs a multicast packet of each of bit sequences B0 to B15 to "1" that represents an output port that outputs a multicast packet.

In addition, information management section 305 sets bits corresponding to output gates that do not output multicast packets of each of bit sequences B0 to B15 to "0" that represents ports that do not output multicast packets.

In the example of bit sequence B0 shown in FIG. 5, output port O1 corresponding to the leftmost bit, Which is the most significant bit, of bit sequence B0 is set up for an output port that outputs a multicast packet.

The data structure of multicast control information 3051 can be arbitrary instead of a bit sequence having bits corresponding to output ports O1 to O5 of multicast control section 205.

When command information "01" that represents a route setup command, a multicast ID, and information that represents an input port that has input a route setup command are output from packet input section 301 to information management section 305, it operates as follows.

First, information management section 305 reads bit sequences B0 to B15 stored in correlation with the multicast ID that is output from packet input section 301. If the multicast ID that is output from packet input section 301 is "4," information management section 305 reads bit sequence B4 stored in correlation with the multicast ID "4."

Next, when information that represents one input port that has input one route setup command is output from packet input section 301, information management section 305 sets the value of a bit corresponding to an output port correlated with the input port of the bit sequence that has been read to "1." Whenever information management section 305 sets up a bit, information management section 305 notifies counter section 304 about that.

In addition, according to this exemplary embodiment, information management section 305 correlatively stores destination information and output ports connected to network switches that have been assigned switch identification information that is the same as destination information.

When information management section 305 is notified by destination determination section 308 that the destination of the route setup command is not network switch 21-1, information management section 305 sets the value of a bit corresponding to an output port stored in correlation with switch identification information that is the same as the destination information concerning which information management section 305 has been notified by destination determination section 308 to "1." In addition, information management section 305 notifies packet output section 302 of the output port that has been set to "1" (namely, an output port connected to a network switch that has been assigned switch identification information that is the same as the destination information).

When information management section 305 is notified by destination determination section 308 that the destination of the route setup command is network switch 21-1, it does not transfer the route setup command to other network switches 21-2 to 21-4 and 22. Thus, in this case, information management section 305 does not set the value of the bit corresponding to the output port stored in correlation with the switch identification information that is the same as the destination information concerning which information management section 305 has been notified by destination determination section 308 to "1."

On the other hand, when command information "10" that represents' a setup completion notification and a multicast ID are output from packet input section 301 to information management section 305, it outputs a bit sequence stored in correlation with the multicast ID of bit sequences B0 to B15 to packet output section 302.

In addition, when information management section 305 is notified by completion notification generation section 307 that a setup completion notification has been generated, information management section 305 outputs a bit sequence stored in correlation with the multicast ID that is output from completion notification generation section 307 to packet output section 302.

In contrast, when command information "11" that represents a multicast packet and a multicast ID are output from packet input section 301 to information management section 305, it outputs a bit sequence stored in correlation with the multicast ID of bit sequences B0 to B15 to packet output section 302.

Comparison section 306 compares the group member process count that is output from process count storing section 303 with the setup completion process count that is output from counter section 304. Thereafter, comparison section 306 outputs the compared result to completion notification generation section 307.

When the command information "10" is output from counter section 304 to comparison section 306, it compares the group member process count that is output from process count storing section 303 with the setup completion process count that is output from counter section 304. Thereafter, comparison section 306 outputs the compared result to correction section 309.

When the compared result by comparison section 306 denotes that the group member process count is the same as the setup completion process count, completion notification generation section 307 generates a setup completion notification that denotes that an output port that outputs a multicast packet has been set up and that designates a computation node that is the transmission source of the route setup command as the destination. Then, completion notification generation section 307 writes the multicast ID that is output from packet input section 301 to the setup completion notification. Thereafter, completion notification generation section 307 outputs the setup completion notification to packet output section 302.

When completion notification generation section 307 has generated the setup completion notification, completion notification generation section 307 notifies information management section 305 about that and outputs the multicast ID that has been written to the setup completion notification to information management section 305.

Packet output section 302 outputs the setup completion notification that is output from completion notification generation section 307 from output ports O1 to O5 corresponding to a bit that has been set to "1" of the bit sequence that is output from information management section 305.

Destination determination section 308 has stored switch identification information assigned to network switch 21-1. Destination determination section 308 compares destination information that is output from packet input section 301 with the stored switch identification information.

When the compared result denotes that the destination information is the same as the stored switch identification information, destination determination section 308 notifies process count storing section 303, counter section 304, and information management section 305 that the destination of the route setup command is network switch 21-1.

In contrast, when the compared result denotes that the destination information is different from the stored switch identification information, destination determination section 308 notifies information management section 305 that the destination of the route setup command is not network switch 21-1 and of provides notification of the destination information.

When the compared result by comparison section 306 denotes that the group member process count is the same as the setup completion process count, correction section 309 reads a bit sequence stored in correlation with the multicast ID that is output from packet input section 301 from information management section 305. Then, correction section 309 changes the value of a bit corresponding to an output port correlated with the input port that has input the setup completion notification of the bit sequence that has been read from "1" to "0".

For example, when the setup completion notification transmitted from network switch 22 is input to input port I5 of network switch 21-1, correction section 309 changes the value of the fifth bit corresponding to output port O5 that is correlated with input port I5 of a bit sequence of multicast control information 3051 stored in correlation with the multicast ID contained in the computation node from "1" to "0."

When the output port that outputs the multicast packet has been set up, if the group member process count stored in a network switch that is not a multicast control switch is the same as the setup completion process count, it is equivalent to the case in which route setup commands that were transmitted from all computation nodes contained in a particular process group have reached not only the multicast control switch but also the network switch.

In this case, multicast communications can be performed among processes contained in the process group not through a multicast control switch. From such a point of view, correction section 309 changes the value of a bit corresponding to an output port that transfers a multicast packet to the multicast control switch of a bit sequence corresponding to the multicast ID assigned to the process group to "0."

Next, with reference to FIG. 6, the operation in the case in which network switches 21-1 to 21-4 and 22 that have the above-described structure perform when they receives a route setup command and a route setup completion notification that are command packets that set up a route will be described. In the following description, it is assumed that computation nodes, in which processes contained in a particular process group each transmit a route setup command that contains destination information that is the same as switch identification information assigned to network switch 22 that is a multicast control switch to network switches 21-1 to 21-4 to which these computation nodes are connected.

When a network switch receives a route setup command, an input buffer section connected to a computation node that has transmitted the route setup command of input buffer sections 201-1 to 201-5 outputs the route setup command to packet input section 301.

Figure 6:
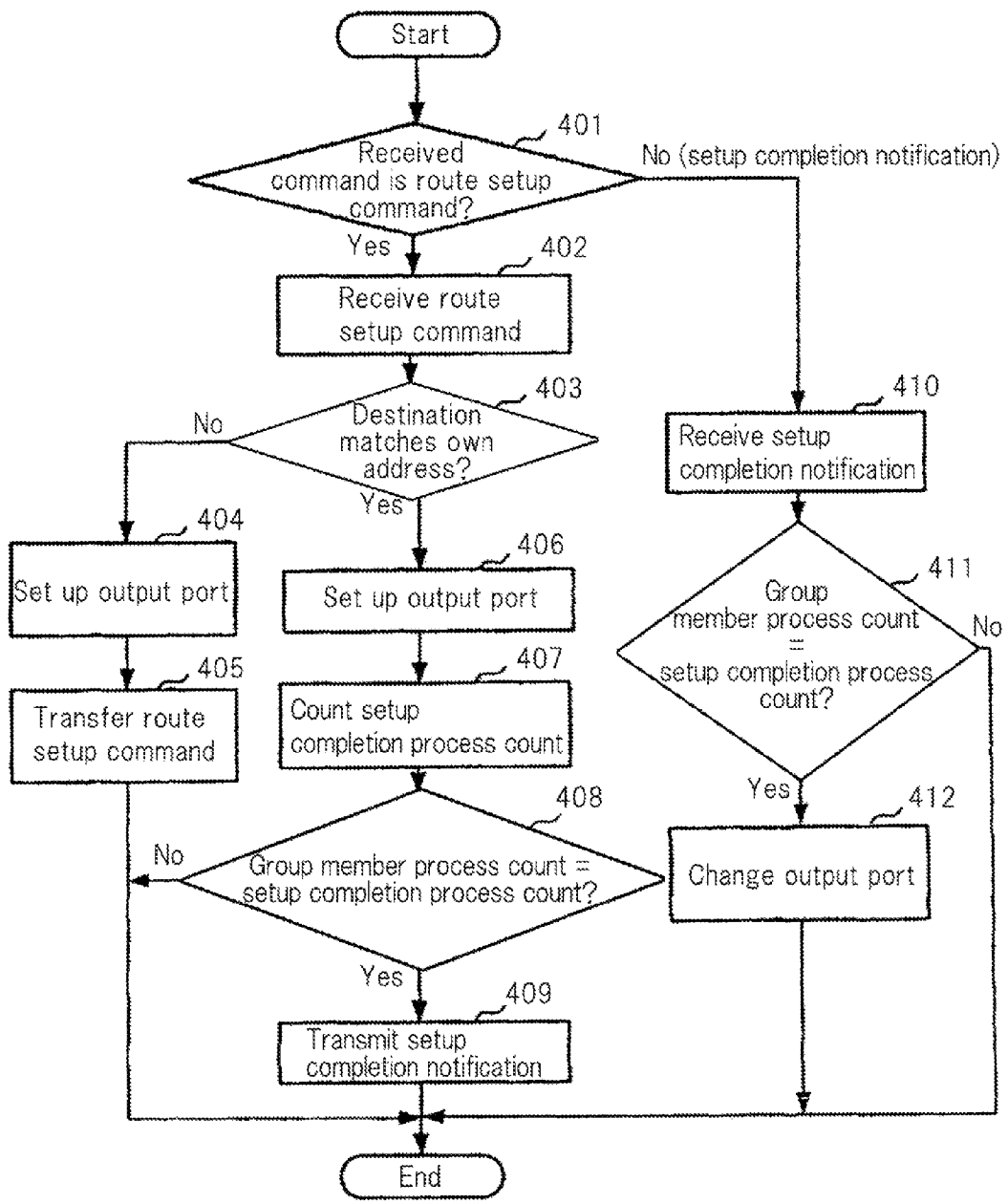
FIG. 6 is a flow chart showing an operation of a network switch that performs when it receives a route setup command and a route setup completion notification.

Then, packet input section 301 determines whether or not a packet that is output from input buffer sections 201-1 to 201-5 is a route setup command at step 401 shown in FIG. 6.

When packet input section 301 determined that the received command is a route setup command at step 401, packet input section 301 outputs the route setup command that is output from input buffer sections 201-1 to 201-5 to packet output section 302 at step 402.

In addition, packet input section 301 identifies packet data that are output from the input buffer section as a route setup command. Thereafter, packet input section 301 outputs destination information contained in the route setup command to destination determination section 308.

In addition, packet input section 301 outputs a multicast ID and a group member process count contained in the route setup command to process count storing section 303. Then, process count storing section 303 correlatively stores the multicast ID and the group member process count that are output from packet input section 301.

In addition, packet input section 301 outputs the multicast ID contained in the route setup command to counter section 304.

In addition, packet input section 301 outputs command information "01," a multicast ID contained in the route setup command transmitted from input buffer sections 201-1 to 201-5, and information that represents an input port that has input the route setup command to information management section 305.

In addition, packet input section 301 outputs the multicast ID contained in the route setup command to completion notification generation section 307.

Thereafter, destination determination section 308 compares the destination information that is output from packet input section 301 with the stored switch identification information at step 403.

When the compared result denotes that the destination information is different from the stored switch identification information, destination determination section 308 notifies information management section 305 of the destination information and that the destination of the route setup command is not network switch 21-1.

Then, information management section 305 designates bit sequence B0 to B15 stored in correlation with the multicast ID that is output from packet input section 301 at step 404. Thereafter, information management section 305 sets the value of the bit corresponding to an output port correlated with the input port that has output one route setup command represented by information that is output from packet input section 301 of the designated bit sequence to "1." Whenever information management section 305 sets up a bit, information management section 305 notifies counter section 304 about that. Whenever counter section 304 is notified by information management section 305 that it has set up a bit, counter section 304 adds "1" to the setup completion process count stored in correlation with the multicast ID that is output from packet input section 301.

In addition, information management section 305 sets the value of the bit corresponding to an output port stored in correlation with the switch identification information that is the same as the destination information concerning which information management section 305 has been notified by destination determination section 308 to "1" at step 404. Thereafter, information management section 305 notifies packet output section 302 of the output port that has been set to "1" (namely, the output portion connected to the network switch assigned the switch identification information that is the same as the destination information).

Then, packet output section 302 outputs the route setup command from the output port concerning which packet output section 302 has been notified by information management section 305 at step 405.

Thereafter, network switch 21-1 waits for a command, namely a route setup command or a route setup completion notification.

In contrast, when the compared result denotes that the destination information is the same as the stored switch identification information at step 406, destination determination section 308 notifies process count storing section 303, counter section 304, and information management section 305 that the destination of the route setup command is network switch 21-1.

Then, information management section 305 designates bit sequence B0 to B15 stored in correlation with the multicast ID that is output from packet input section 301 at step 406. Then, information management section 305 sets the value of the bit corresponding to one output port that is correlated with one input port and that has output one route setup command represented by information that is output from packet input section 301 to "1" at step 406. Then, whenever information management section 305 sets up a bit, information management section 305 notifies counter section 304 about that.

Then, whenever counter section 304 is notified by information management section 305 that it has set up a bit, counter section 304 adds "1" to the setup completion process count stored in correlation with the multicast ID that is output from packet input section 301 at step 407. When counter section 304 is notified by destination determination section 308 that the destination of the route setup command is network switch 21-1, counter section 304 outputs the stored setup completion process count to comparison section 306.

When process count storing section 303 is notified by destination determination section 308 that the destination of the route setup command is the network switch, process count storing section 303 outputs the group member process count stored in correlation with the multicast ID that is output from packet input section 301 to comparison section 306.

Then, comparison section 306 compares the group member process count that is output from process count storing section 303 with the setup completion process count that is output from counter section 304 and outputs the compared result to information management section 305 and completion notification generation section 307 at step 408.

When the compared result denotes that the group member process count is not the same as the setup completion process count, since route setup commands have not arrived from all processes contained in the process group that execute multicast communications, a route setup command waiting state takes place.

In contrast, when the compared result denotes that the group member process count is the same as the setup completion process count, it is equivalent to the case that route setup commands have arrived from all processes contained in the process group in which execute multicast communications.

Thus, completion notification generation section 307 generates a setup completion notification that denotes that an output port that outputs a multicast packet to the process group has been set up and outputs the setup completion notification to packet output section 302 at step 409. At this point, completion notification generation section 307 writes the multicast ID that is output from packet input section 301 to the setup completion notification.

When the completion notification generation section 307 has generated the setup completion notification, completion notification generation section 307 notifies information management section 305 about that and outputs the multicast ID written in the setup completion notification to information management section 305. Then, information management section 305 outputs a bit sequence stored in correlation with the multicast ID that is output from completion notification generation section 307 to packet output section 302.

Then, packet output section 302 outputs the setup completion notification generated by completion notification generation section 307 from output ports O1 to O5 corresponding to the bit that has been set to "1" of the bit sequence that is output from information management section 305. Thus, the setup completion notifications are transmitted to computation nodes in which processes contained in the process group operate.

Next, the case in which network switch 21-1 receives a route setup completion notification will be described.

An input buffer section connected to a multicast control switch (in this example, network switch 22) that has transmitted a setup completion notification of input buffer sections 201-1 to 201-5 outputs the setup completion notification to packet input section 301.

Then, packet input section 301 identifies packet data that are output from input buffer sections 201-1 to 201-5 as a setup completion notification at step 401.

In this case, packet input section 301 outputs a multicast ID contained in the setup completion notification that is input from input buffer sections 201-1 to 201-5 and information that represents an input port that has input the setup completion notification to correction section 309 at step 410.

In addition, packet input section 301 outputs the multicast ID contained in the setup completion notification to process count storing section 303. Then, process count storing section 303 outputs a group member process count stored in correlation with the multicast ID to comparison section 306.

In addition, packet input section 301 outputs command information "10" and the multicast ID contained in the setup completion notification to counter section 304. Then, counter section 304 outputs the command information "10" and the setup completion process count stored in correlation with the multicast ID to comparison section 306.

When the command information "10" is output from counter section 304 to comparison section 306, it compares the group member process count that is output from process count storing section 303 with the setup completion process count that is output form counter section 304 at step 411. Then, comparison section 306 outputs the compared result to correction section 309.

When the compared result denotes that the group member process count is the same as the setup completion process count, correction section 309 reads a bit sequence stored in correlation with the multicast ID that is output from packet input section 301 from information management section 305 at step 412. Then, correction section 309 changes the value of a bit corresponding to an output port that is correlated with the input port that has input the setup completion notification represented by information received from packet input section 301 from "1" to "0."

Next, operation of the parallel computer system having the above-described structure will be described.

First, with reference to FIG. 7, the operation of the parallel computer system that sets up a transfer route of a multicast packet will be described. Here, the operations of computation node 11-1, network switch 21-1, and network switch 22 will be exemplified.

In the following description, it is assumed that a computation node in which each process contained in one process group operates has stored a multicast ID of the process group, destination information that is the same as switch identification information of network switch 22 that controls a multicast packet transmitted and received among computation nodes of the process group, and a group member process count that is the number of computation nodes in which individual processes contained in the process group operate.

Figure 7:
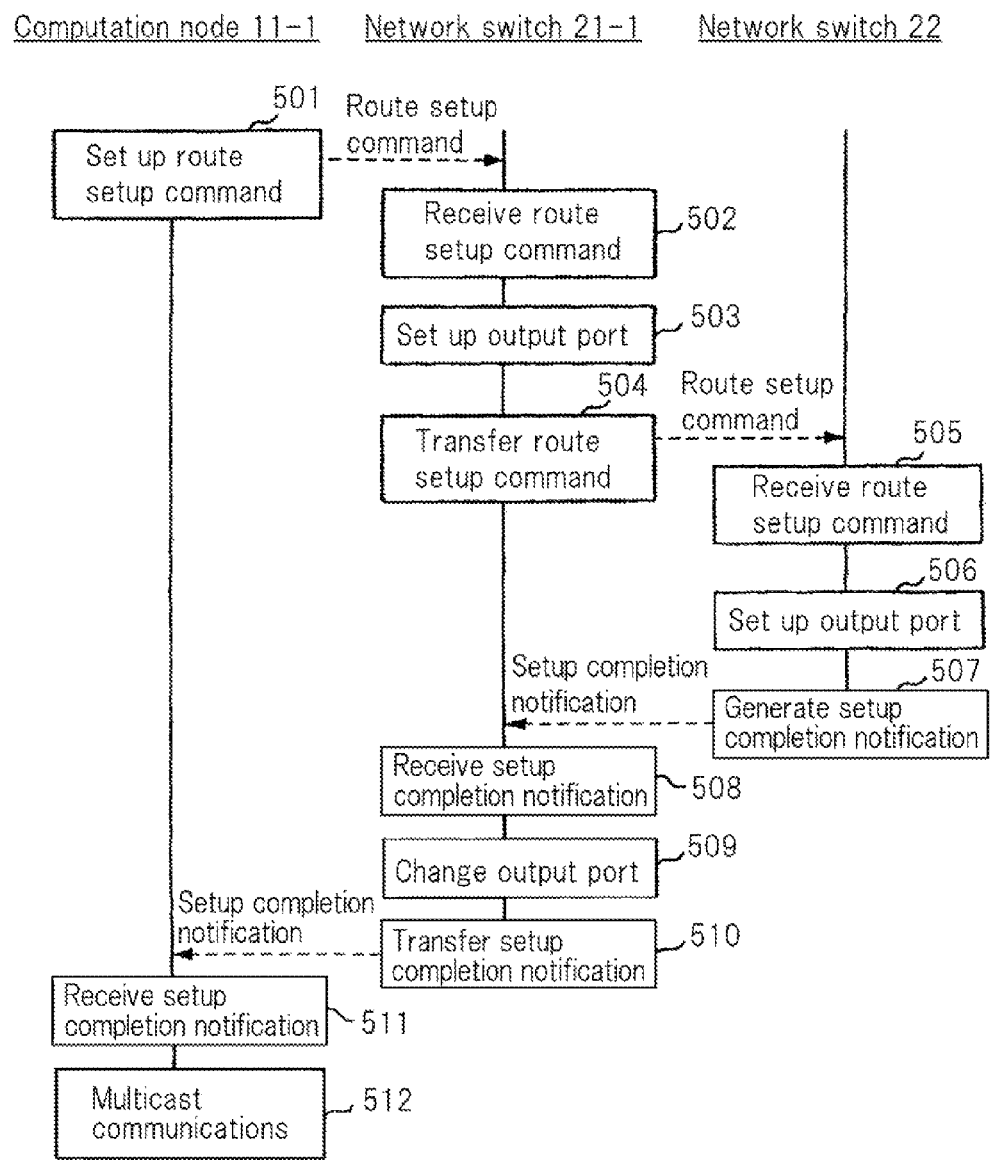
FIG. 7 is a schematic diagram showing an operation sequence of a parallel computer system that performs when it sets up an output port that outputs a multicast packet.

Each computation node in which each process contained in one process group operates generates a route setup command and transmits it to network switches 21-1 to 21-4 connected to the computation node at step 501 shown in FIG. 7.

In this example, computation node 11-1 generates a route setup command that contains a stored multicast ID, destination information, and a group member process count and transmits the route setup command to network switch 21-1. Network switch 22 assigned switch identification information that is the same as the destination information contained in the route setup command is the destination of the route setup command.

Then, network switch 21-1 receives the route setup command transmitted from computation node 11-1 at step 502. Then, network switch 21-1 correlatively stores the multicast ID and the group member process count contained in the route setup command.

Then, network switch 21-1 designates bit sequence B0 to 15 stored in correlation with the multicast ID contained in the route setup command at step 503. Then, network switch 21-1 sets the value of one bit corresponding to an output port correlated with an input port that has input the route setup command of the designated bit sequence to "1."

Whenever network switch 21-1 sets up a bit, network switch 21-1 adds "1" to the setup completion process count stored in correlation with the multicast ID contained in the route setup command.

In addition, network switch 21-1 compares the destination information contained in the route setup command with the switch identification information assigned to and stored in network switch 21-1.

Since the compared result denotes that the destination information is different from the stored switch identification information, network switch 21-1 sets the value of a bit corresponding to an output port stored in correlation with switch identification information that is the same as the destination information contained in the route setup command of the designated bit sequence to "1" at step 503.

Thereafter, network switch 21-1 outputs the route setup command from an output port stored in correlation with the switch identification information that is the same as the destination information (namely, an output port connected to network switch 22 assigned the switch identification information that is the same as the destination information) at step 504. Thus, network switch 21-1 transfers the route setup command transmitted from computation node 11-1 to network switch 22.

Then, network switch 22 receives the route setup command transferred from network switch 21-1 at step 505.

Then, network switch 22 correlatively stores the multicast ID and the group member process count contained in the route setup command.

Then, network switch 22 designates a bit sequence stored in correlation with the multicast ID contained in the route setup command of bit sequences B0 to B15 at step 506. Then, network switch 22 sets the value of one bit corresponding to an output port correlated with the input port that has input the route setup command of the designated bit sequence to "1."

Whenever network switch 22 sets up a bit, network switch 22 adds "1" to the setup completion process count stored in correlation with the multicast ID contained in the route setup command.

Next, network switch 22 compares the destination information contained in the route setup command with the switch identification information assigned to and stored in network switch 22.

Since the compared result denotes that the destination information is the same as the stored switch identification information, network switch 22 compares the setup completion process count with the group member process count.

When the compared result denotes that the group member process count is the same as the setup completion process count, network switch 22 generates a setup completion notification that denotes an output port that outputs a multicast packet to the process group assigned the multicast ID contained in the route setup command at step 507. According to this exemplary embodiment, at this point, network switch 22 writes the multicast ID of the process group that has been set tip to the setup completion notification. Then, network switch 22 transmits the setup completion notification that designates computation node 11-1 that is the transmission source of the route setup command as the destination to network switch 21-1. Network switch 22 transmits the setup completion notification to computation nodes in which processes of the process group assigned the multicast ID operate as well as computation node 11-1.

Then, network switch 21-1 receives the setup completion notification transmitted from network switch 22 at step 508.

Then, network switch 21-1 compares the group member process count stored in correlation with the multicast ID contained in the setup completion notification with the setup completion process count stored in correlation with the multicast ID contained in the setup completion notification.

When the compared result denotes that the group member process count is the same as the setup completion process count, network switch 21-1 reads a bit sequence stored in correlation with the multicast ID contained in the setup completion notification at step 509. Then, network switch 21-1 changes the value of the bit corresponding to an output port correlated with an input port that has input the setup completion notification from "1" to "0."

Network switch 21-1 transfers the setup completion notification transmitted from network switch 22 to its destination, computation node 11-1, at step 510.

Then, computation node 11-1 receives the setup completion notification transferred from network switch 21-1 at step 511. As well as computation node 11-1, computation nodes in which processes contained in the process group assigned the multicast ID contained in the setup completion notification operate also receive the setup completion notification transmitted from network switch 22.

Then, the computation nodes in which the processes contained in the process group operate recognize that a multicast control switch has set up an output port that has been designated by a route setup command and that outputs a multicast packet. Thus, these computation nodes can mutually perform multicast communications. These computation nodes transmit multicast packets when a program instructs them to execute the multicast communications.

Next, two exemplary operations in which a plurality of particular computation nodes that have received setup completion notifications and in which processes contained in the same process group operate perform multicast communications will be described.

In the following exemplary description, computation node 11-1 is connected to input port I1 of multicast control section 205 of network switch 21-1, whereas computation node 11-2 is connected to input port I2 of multicast control section 205 of network switch 21-1. Likewise, computation node 12-1 is connected to input port I1 of multicast control section 205 of network switch 21-2. Likewise, computation node 13-3 is connected to input port I3 of multicast control section 205 of network switch 21-3. Likewise, computation node 14-4 is connected to input node I4 of multicast control section 205 of network switch 21-4.

In the following exemplary description, output port O5 of multicast control section 205 of network switch 21-1 is connected to input port I1 of multicast control section 205 of network switch 22. Likewise, output port O5 of multicast control section 205 of network switch 21-2 is connected to input port I2 of multicast control section 205 of network switch 22. Likewise, output port O5 of multicast control section 205 of network switch 21-3 is connected to input port I3 of multicast control section 205 of network switch 22.

Likewise, output port O5 of multicast control section 205 of network switch 21-4 is connected to input port I4 of multicast control section 205 of network switch 22.

First, a first exemplary operation in which a plurality of particular computation nodes perform multicast communications will be described. In the first exemplary operation, a process group composed of single processes that operate in computation nodes 11-1, 11-2, 12-1, 13-3, and 14-4, (namely, the group member process count is "5") performs multicast communications. In the following, the case in which a multicast ID assigned to this process group is "1" will be exemplified.

First, computation nodes 11-1, 11-2, 12-1, 13-3, and 14-4 respectively generate route setup commands as shown in FIG. 2. In this exemplary description, the route setup commands contain a multicast ID (="1") assigned to the process group, destination information (=information that is the same as switch identification information assigned to network switch 22), and a group member process count (="5") that represents the number of processes that are contained in the process group and that operate in the computation nodes.

Figure 8:
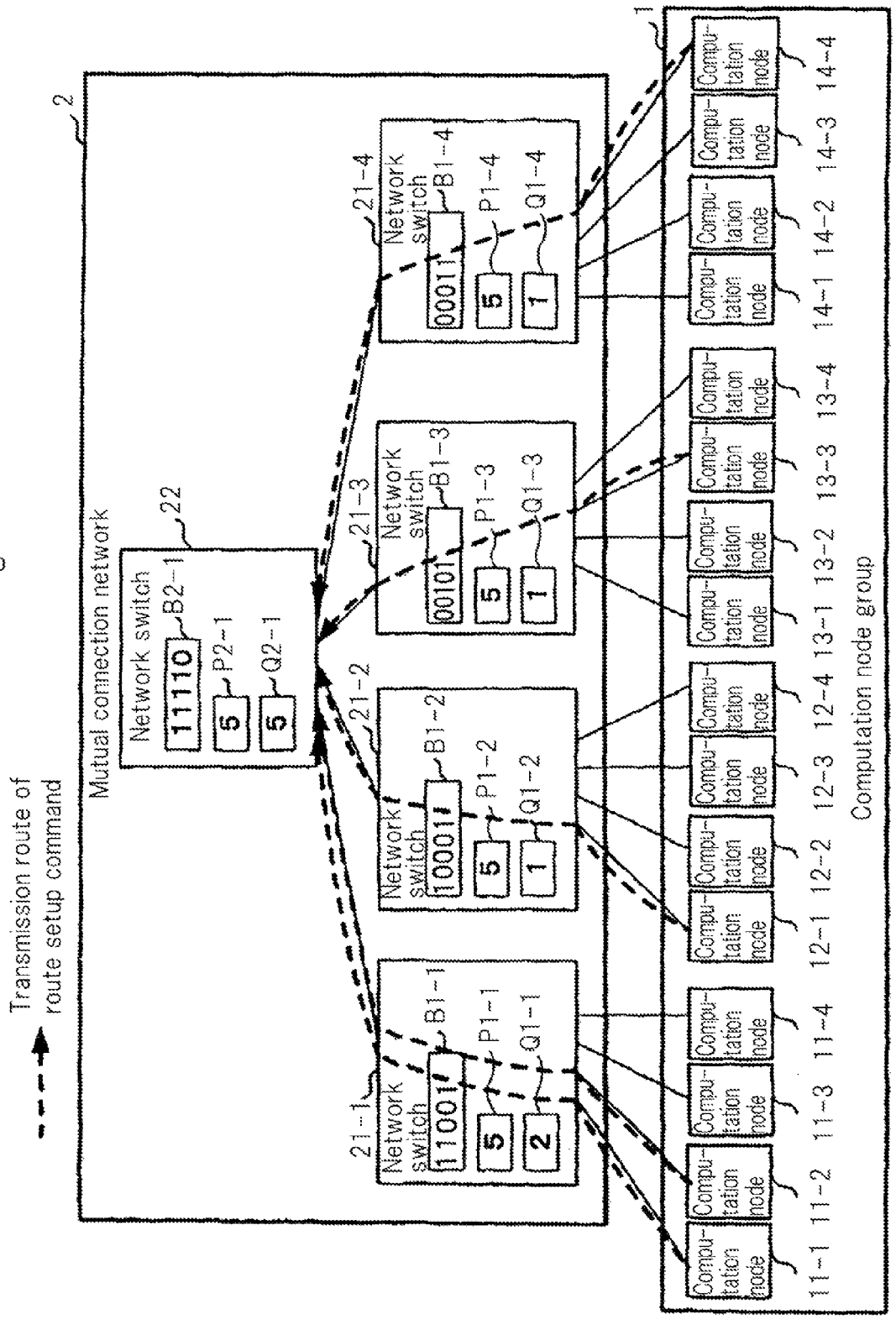
FIG. 8 is a schematic diagram showing a flow of route setup commands that are transmitted in the parallel computer system according to a first exemplary operation.

As shown in FIG. 8, computation nodes 11-1 and 11-2 transmit the route setup commands to network switch 21-1. Likewise, computation node 12-1 transmits the route setup command to network switch 21-2. Likewise, computation node 13-3 transmits the route setup command to network switch 21-3. Likewise, computation node 14-4 transmits the route setup command to network switch 21-4.

Then, network switch 21-1 receives the route setup command transmitted from computation node 11-1 and the route setup command transmitted from computation node 11-2. Then, network switch 21-1 correlatively stores the multicast ID "1" and the group member process count "5" contained in each route setup command.

In the following, group member process counts stored in network switches 21-1 to 21-4 are denoted by P1-1 to P1-4, respectively. Likewise, the group member process count stored in network switch 22 is denoted by P2-1.

Network switch 21-1 reads bit sequence B1-1 stored in correlation with the multicast ID "1" contained in each received route setup command.

Then, network switch 21-1 sets the value of a bit corresponding to output port O1 correlated with input port I1 that has input the route setup command transmitted from computation node 11-1 and the value of the bit corresponding to output port O2 correlated with input port I2 that has input the route setup command transmitted from computation node 11-2 of bit sequence B1-1 to "1."

Whenever network switch 21-1 sets up the value of a bit according to the route setup command transmitted from each of computation nodes 11-1 and 11-2, network switch 21-1 adds "1" to the stored setup completion process count. Network switch 21-1 correlatively stores the setup completion process count and the multicast ID (="1") contained in the route setup command received from each of computation nodes 11-1 and 11-2.

In this example, network switch 21-1 sets up the value of a bit according to the route setup command received from computation node 11-1 and the value of a bit according to the route setup command received from computation node 11-2. Thus, when network switch 21-1 has set up the values of these bits, the setup completion process count stored in network switch 21-1 in correlation with the multicast ID (="1") contained in each route setup command is "2."

In the following, setup completion process counts stored in network switches 21-1 to 21-4 are denoted by Q1-1 to Q1-4, respectively. Likewise, the setup completion process count stored in network switch 22 is denoted by Q2-1.

Since the destination information contained in each route setup command is different from switch identification information assigned to and stored in network switch 21-1, it sets the value of a bit corresponding to output port O5 connected to network switch 22 represented by the destination information of bit sequence B1-1 to "1."

When the values of the bits of bit sequence B1-1 have been updated, bit sequence B1-1 stored in network switch 21-1 is in the state (="11001") as shown in FIG. 8.

Then, network switch 21-1 transfers the route setup command transmitted from computation node 11-1 and the route setup command transmitted from computation node 11-2 to network switch 22 represented by the destination information through output port O5 connected to network switch 22 represented by the destination information.

In addition, network switch 21-2 correlatively stores the multicast ID "1" and the group member process count "5" contained in the route setup command transmitted from computation node 12-1.

In addition, network switch 21-2 reads bit sequence B1-2 stored in correlation with the multicast ID "1" contained in the route setup command.

Then, network switch 21-2 sets the value of a bit corresponding to output port O1 correlated with input port I1 that has input the route setup command received from computation node 12-1 of bit sequence B1-2 to "1." When this bit has been set up, as shown in FIG. 8, setup completion process count Q1-2 stored in correlation with the multicast ID (="1") contained in the route setup command is "1."

In addition, since the destination information contained in the route setup command is different from the switch identification information assigned to and stored in network switch 21-2, it sets the value of the bit corresponding to output port O5 connected to network switch 22 represented by the destination information of bit sequence B1-2 to "1."

When the values of these bits of bit sequence B1-2 have been updated, bit sequence B1-2 stored in network switch 21-2 is in the state (="10001") as shown in FIG. 8. Network switch 21-2 transfers the route setup command to network switch 22 through output port O5 connected to network switch 22 represented by the destination information.

In addition, network switch 21-3 correlatively stores the multicast ID "1" and group member process count "5" contained in the route setup command transmitted from computation node 13-3.

In addition, network switch 21-3 sets the value of a bit corresponding to output port O3 correlated with input port I3 that has input the route setup command of bit sequence B1-3 stored in correlation with the multicast ID "1" contained in the route setup command to "1." When this bit has been set up, as shown in FIG. 8, setup completion process count Q1-3 that is stored in network switch 21-3 in correlation with the multicast ID (="1") contained in the route setup command is "1."

Since the destination information contained in the route setup command is different from the stored switch identification information, switch 21-3 sets the value of the bit corresponding to output port O5 connected to network switch 22 represented by the destination information of bit sequence B1-3 to "1."

When the values of these bits of bit sequence B1-3 have been updated, bit sequence B1-3 stored in network switch 21-3 is in the state (="00101") as shown in FIG. 8. Network switch 21-3 transfers the route setup command to network switch 22 through output port O5 connected to network switch 22 represented by the destination information.

In addition, network switch 21-4 correlatively stores the multicast ID "1" and the group member process count "5" contained in the route setup command transmitted from computation node 14-4.

In addition, network switch 21-4 sets the value of a bit corresponding to output port O4 correlated with input port I4 that has input the route setup command of bit sequence B1-4 that is stored in network switch 21-4 in correlation with the multicast ID "1" contained in the route setup command to "1." When the bit has been set up as shown in FIG. 8, setup completion process count Q1-4 that is stored in network switch 21-4 in correlation with the multicast ID (="1") contained in the route setup command is "4."

In addition, since the destination information contained in the route setup command is different from the switch identification information stored in network switch 21-4, it sets the value of a bit corresponding to output port O5 connected to network switch 22 represented by the destination information of bit sequence B1-4 to "1."

When the values of these bits of bit sequence B1-4 have been updated, bit sequence B1-4 stored in network switch 21-4 is in the state (="00011") as shown in FIG. 8. Then, network switch 21-4 transfers the route setup command to network switch 22 through output port O5 connected to network switch 22 represented by the destination information.

Thereafter, network switch 22 receives the route setup commands transferred from network switches 21-1 to 21-4. Then, network switch 22 correlatively stores the multicast ID "1" and the group member process count "5" Contained in the route setup command transferred from each of network switches 21-1 to 21-4.

Then, network switch 22 reads bit sequence B2-1 stored in correlation with the multicast ID "1" contained in each received route setup command.

Then, network switch 22 sets the value of a bit corresponding to output port O1 correlated with input port I1 that has input the route setup command transmitted from computation node 11-1 and transferred through network switch 21-1 and the route setup command transmitted from computation node 11-2 and transferred through network switch 21-1 of bit sequence B 2-1 to "1." Whenever network switch 22 sets up the value of a bit according to the route setup command transmitted from computation node 11-1 and the value of a bit according to the route setup command transmitted from computation node 11-2, network switch 22 adds "1" to the setup completion process count.

In addition, network switch 22 sets the value of a bit corresponding to output port O2 correlated with input port I2 that has input the route setup command transmitted from network switch 21-2, the value of the bit corresponding to output port O3 correlated with input port I3 that has input the route setup command transmitted from network switch 21-3, and the value of the bit corresponding to output port O4 correlated with input port I4 that has input the route setup command transmitted from network switch 21-4 of bit sequence B2-1 to "1."

When the values of these bits of bit sequence B2-1 have been updated, bit sequence B 2-1 stored in network switch 22 is in the state (="11110") as shown in FIG. 8. When these bits have been set up, setup completion process count Q2-1 stored in network switch 22 in correlation with the multicast ID (="1") contained in each route setup command is "5."

The destination information contained in each route setup command received by network switch 22 is the same as the switch identification information assigned to and stored in network switch 22. In this case, since network switch 22 does not transfer the route setup commands to other network switches 21-1 to 21-4, network switch 22 does not set the value of the bit corresponding to an output port stored in correlation with the switch identification information that is the same as the destination information to "1."

In addition, since the destination information contained in each route setup command received by network switch 22 is the same as the switch identification information stored in network switch 22, it compares setup completion process count Q2-1 with group member process count P2-1.

When the compared result denotes that group member process count P2-1 is the same as setup completion process count Q2-1, network switch 22 generates setup completion notifications that denote that output ports that output multicast packets to the process group assigned the multicast ID "1" contained in route setup commands have been set up and that designate computation nodes 11-1, 11-2, 12-1, 13-3, and 14-4 that are transmission sources of the route setup commands as destinations. According to this exemplary embodiment, network switch 22 writes the multicast ID (="1") of the process group that has been set up to the setup completion notifications.

Then, network switch 22 outputs setup completion notifications to output ports O1 to O4 corresponding to bits that have been set to "1" of bit sequence B 2-1 (="11110") that is stored in correlation with the multicast ID "1" written into the setup completion notifications. Thus, the setup completion notifications are transmitted to computation nodes that have transmitted the route setup commands through the output ports that have been set up as output ports that output multicast packets.

Figure 9:
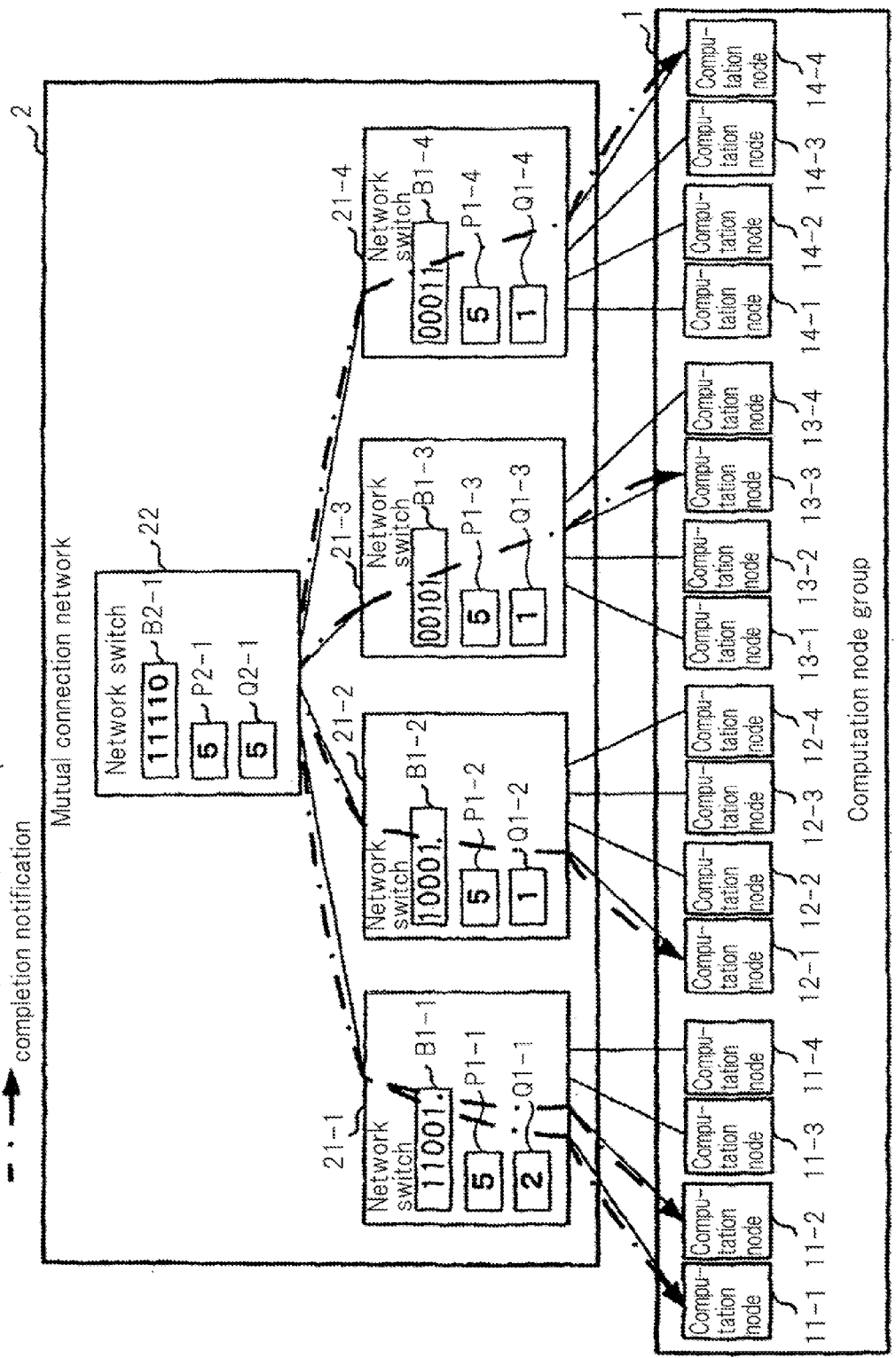
FIG. 9 is a schematic diagram showing a flow of setup completion notifications that are transmitted in the parallel computer system according to the first exemplary operation.

In this exemplary description, as shown in FIG. 9, network switch 22 transmits setup completion notifications that designate computation node 11-1 and 11-2 as destinations to network switch 21-1. Likewise, network switch 22 transmits a setup completion notification that designates computation node 12-1 as a destination to network switch 21-2. Likewise, network switch 22 transmits a setup completion notification that designates computation node 13-3 as a destination to network switch 21-3. Likewise, network switch 22 transmits a setup completion notification that designates computation node 14-4 as a destination to network switch 21-4.

Then, network switches 21-1 to 21-4 respectively receive the setup completion notifications transmitted from network switch 22.

Then, network switches 21-1 to 21-4 compare group member process counts P1-1 to P1-4 shown in FIG. 9 and stored in correlation with the multicast ID that is the same as the multicast ID "1" contained in the setup completion, notifications with setup completion process counts Q1-1 to Q1-4 shown in FIG. 9 and stored in correlation with the multicast ID that is the same as the multicast ID "1" contained in the setup completion notifications, respectively.

The compared result denotes that group member process counts P1-1 to P1-4 stored in network switches 21-1 to 21-4 are different from setup completion process counts Q1-1 to Q1-4 stored in network switches 21-1 to 21-4, respectively.

In this case, network switches 21-1 to 21-4 do not change the value of a bit corresponding to the output port correlated with the input ports that have input the setup completion notification of bit sequences B1-1 to B1-4 stored in correlation with the multicast ID that is the same as the multicast ID "1" contained in the setup completion notifications.

Then, network switch 21-1 transfers the setup completion notifications transmitted from network switch 22 to computation nodes 11-1 and 11-2 that are their destinations. Likewise, network switch 21-2 transfers the setup completion notification transmitted from network switch 22 to computation node 12-1 that is its destination. Likewise, network switch 21-3 transfers the setup completion notification transmitted from network switch 22 to computation node 13-3 that is, its destination. Likewise, network switch 21-4 transfers the setup completion notification transmitted from network switch 22 to computation node 13-4 that is its destination.

Then, computation nodes 11-1, 11-2, 12-1, 13-3, and 14-4 receive the setup completion notifications transferred from network switch 21-1. Then, individual processes contained in the process group that operate in these computation nodes recognize that the multicast control switch has set up the output ports that output multicast packets requested by the route setup commands. Thus, computation nodes 11-1, 11-2, 12-1, 13-3, and 14-4 can mutually transmit multicast packets. These computation nodes transmit multicast packets, for example, when a program causes them to execute multicast communications.

Next, with reference to FIG. 10, the first exemplary operation in the case in which computation nodes 11-1, 11-2, 12-1, 13-3, and 14-4 receive setup completion notifications and then computation node 11-1 transmits a multicast packet will be described.

Figure 10:
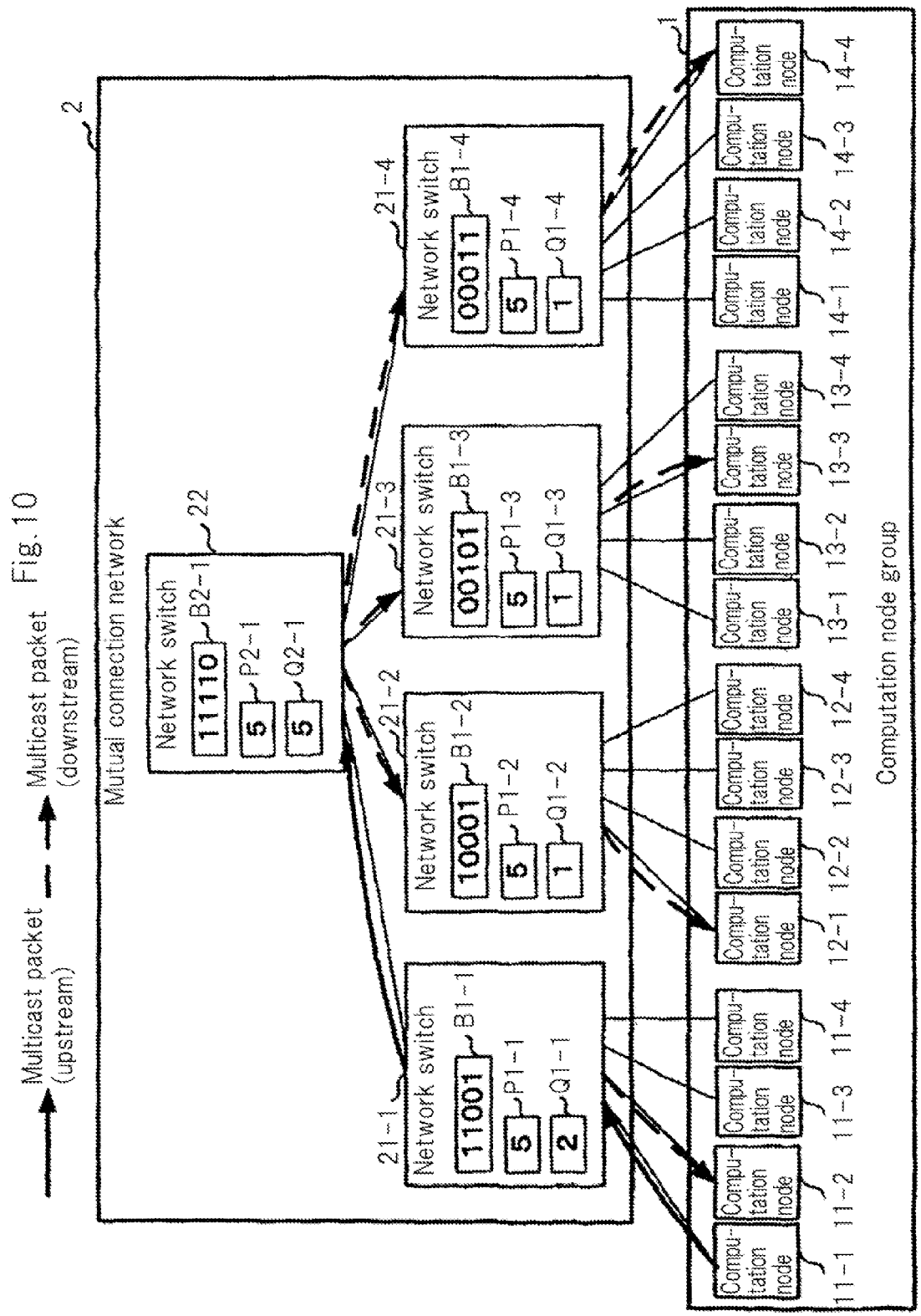
FIG. 10 is a schematic diagram showing a flow of multicast packets transmitted in the parallel computer system according to the first exemplary operation.

As shown in FIG. 10, network switch 21-1 receives a multicast packet transmitted from computation node 11-1. Then, network switch 21-1 identifies input port I1 that has input the multicast packet transmitted from computation node 11-1.

Then, network switch 21-1 outputs multicast packets to output ports other than the output port correlated with input port I1 that has been identified of output ports corresponding to bits that have been set to "1" of bit sequence B1-1 (="11001") shown in FIG. 10 and stored in correlation with the multicast ID (="1") contained in the multicast packets (in this example, output ports O2 and O5). Thus, network switch 21-1 transfers the multicast packet transmitted from computation node 11-1 to computation node 11-2 connected to output port O2 and network switch 22 connected to output port O5.

Thereafter, network switch 22 receives the multicast packet transferred from network switch 21-1. Then, network switch 22 identifies input port I1 that has input the multicast packet.

Then, network switch 22 outputs multicast packets to output ports O2, O3, and O4 other than output port O1 correlated with input port I1 that has been identified of output ports corresponding to bits that have been set to "1" of bit sequence B1-1 (="11001") shown in FIG. 10 and stored in correlation with the multicast ID (="1") contained in the multicast packets. Thus, network switch 22 transfers the multicast packet transmitted from computation node 11-1 to network switch 21-2 connected to output port O2, network switch 21-3 connected to output port O3, and network switch 21-4 connected to output port O4.

Then, network switch 21-2 receives the multicast packet transferred from network switch 22 and identifies input port I5 that has input the multicast packet.

Then, network switch 21-2 outputs the multicast packet to output port O1 other than output port O5 correlated with input port I5 that has been identified of output ports corresponding to bits that have been set to "1" of bit sequence B 1-2 (="10001") shown in FIG. 10 and stored in correlation with the multicast ID (="1") contained in the multicast packet. Thus, network switch 21-2 transfers the multicast packet transmitted from computation node 11-1 to computation node 12-1 connected to output port O1.

Likewise, network switch 21-3 receives the multicast packet transferred from network switch 22 and identifies input port I5 that has input the multicast packet.

Then, network switch 21-3 outputs the multicast packet to output port O3 other than output port O5 correlated with input port I5 that has been identified of output ports corresponding to bits that have been set to "1" of bit sequence B1-3 (="00101") shown in FIG. 10 and stored in correlation with the multicast ID (="1") contained in the multicast packet. Thus, network switch 21-3 transfers the multicast packet transmitted from computation node 11-1 to computation node 13-3 connected to output port O3.

Likewise, network switch 21-4 receives the multicast packet transferred from network switch 22 and identifies input port I5 that has input the multicast packet.

Then, network switch 21-4 outputs the multicast packet to output port O4 other than output port O5 correlated with input port I5 that has been identified of output ports corresponding to bits that have been set to "1" of bit sequence B 1-4 (="00011") shown in FIG. 10 and stored in correlation with the multicast ID (="1") contained in the multicast packet. Thus, network switch 21-4 transfers the multicast packet transmitted from computation node 11-1 to computation node 14-4 connected to output port O4. After computation nodes 11-1, 11-2, 12-1, 13-3, and 14-4 respectively have received setup completion notifications, computation node 11-1 completes a series of operations that transmit multicast packets.

Next, a second exemplary operation in which a plurality of particular computation nodes perform multicast communications will be described.

In the second exemplary operation, a process group composed of processes that operate in computation nodes 11-1, 11-2, 11-3, and 11-4 (namely, the group member process count is "4") performs multicast communications.

In other words, in the second exemplary operation, a process group composed of single processes that operate in computation nodes connected to any one network switch, network switch 21-1, of network switches other than a multicast control switch performs multicast communications. In the following, a case in which a multicast ID assigned to this process group is "1" will be exemplified.

First, computation nodes 11-1 to 11-4 respectively generate route setup commands as shown in FIG. 2. In this exemplary description, the route setup commands contain a multicast ID (="1") assigned to the process group, destination information (=information that is the same as switch identification information assigned to network switch 22), and a group member process count (="4") that represents the number of processes that are contained in the process group and that operate in the computation nodes.

Figure 11:
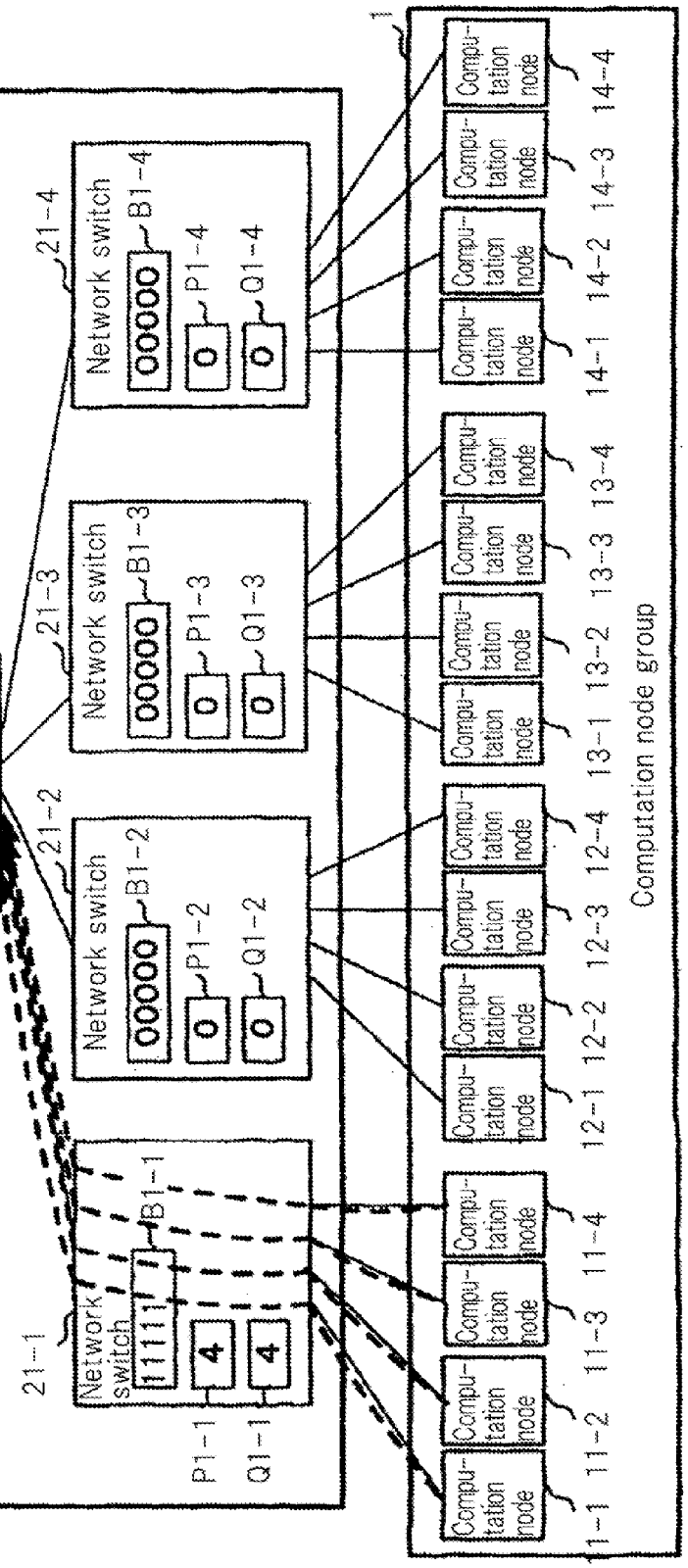
FIG. 11 is a schematic diagram showing a flow of route setup commands that are transmitted in the parallel computer system according to a second exemplary operation.

As shown in FIG. 11, computation nodes 11-1, 11-2, 11-3, and 11-4 transmit the route setup commands to network switch 21-1.

Then, network switch 21-1 receives the route setup commands transmitted from computation nodes 11-1 to 11-4. Then, network switch 21-1 correlatively stores the multicast ID "1" and the group member process count "5" contained in each route setup command.

In addition, network switch 21-1 reads bit sequence B1-1 stored in correlation with the multicast ID "1" contained in each received route setup command.

Then, network switch 21-1 sets the value of the bit corresponding to output port O1 correlated with input port I1 that has input the route setup command transmitted from computation node 11-1, the value of the bit corresponding to output port O2 correlated with input port I2 that has input the route setup command transmitted from computation node 11-2, the value of the bit corresponding to output port O3 correlated with input port I3 that has input the route setup command transmitted from computation node 11-3, and the value of the bit corresponding to output port O4 correlated with input port I4 that has input the route setup command transmitted from computation node 11-4 of bit sequence B1-1 to "1."

Whenever network switch 21-1 sets up the value of a bit according to the route setup command transmitted from each of computation nodes 11-1, 11-2, 11-3, and 11-4, network switch 21-1 adds "1" to stored setup completion process count Q1-1. Thus, when network switch 21-1 has set up the values of these bits, the setup completion process count stored in network switch 21-1 in correlation with the multicast ID (="1") contained in each route setup command is "4."

Since the destination information contained in each route setup command is different from switch identification information assigned to and stored in network switch 21-1, it sets the value of the bit corresponding to output port O5 connected to network switch 22 represented by the destination information of bit sequence B1-1 to "1."

When the values of the bits of bit sequence B1-1 have been updated, bit sequence B1-1 stored in network switch 21-1 is in the state (="11111") as shown in FIG. 11.

Then, network switch 21-1 transfers the route setup command transmitted from computation node 11-1, the route setup command transmitted from computation node 11-2, the route setup command transmitted from computation node 11-3, and the route setup command transmitted from computation node 11-4 to network switch 22 represented by the destination information through output port O5 connected to network switch 22 represented by the destination information.

Thereafter, network switch 22 receives the route setup commands transferred from network switches 21-1 to 21-4. Then, network switch 22 correlatively stores the multicast ID "1" and the group member process Count "4" contained in each route setup command transferred from network switch 21-1.

Then, network switch 22 reads bit sequence B2-1 stored in correlation with the multicast ID "1" contained in each received route setup command.

Then, network switch 22 sets the value of a bit corresponding to output port O1 correlated with input port I1 that has input the route setup command transmitted from computation node 11-1 and transferred through network switch 21-1, the route setup command transmitted from computation node 11-2 and transferred through network switch 21-1, the route setup command transmitted from computation node 11-3 and transferred through network switch 21-1, and the route setup command transmitted from computation node 11-4 and transferred through network switch 21-1 of bit sequence B 2-1 to "1."

Whenever network switch 22 sets up the value of a bit according to the route setup command transmitted from computation node 11-1, the value of a bit according to the route setup command transmitted from computation node 11-2, the value of a bit according to the route setup command transmitted from computation node 11-3, and the value of a bit according to the route setup command transmitted from computation node 11-4, network switch 22 adds "1" to the setup completion process count.

When the values of these bits of bit sequence B2-1 have been updated, bit sequence B 2-1 stored in network switch 22 is in the state (="10000") as shown in FIG. 11. When these bits have been set up, setup completion process count Q2-1 stored in network switch 22 in correlation with the multicast ID (="1") contained in each route setup command is "4"

The destination information contained in each route setup command received by network switch 22 is the same as the switch identification information assigned to and stored in network switch 22. In this case, since network switch 22 does not transfer the route setup commands to other network switches 21-1 to 21-4, network switch 22 does not set the value of a bit corresponding to an output port stored in correlation with the switch identification information that is the same as the destination information to "1."

In addition, since the destination information contained in each received route setup command is the same as the stored switch identification information, network switch 22 compares setup completion process count Q2-1 with group member process count P2-1.

When the compared result denotes that group member process count P2-1 is the same as setup completion process count Q2-1, network switch 22 generates setup completion notifications that denote that output ports that output multicast packets to the process group assigned the multicast ID "1" contained in route setup commands have been set up and that designate computation nodes 11-1 to 11-4 that are transmission sources of the route setup commands as destinations. According to this exemplary embodiment, network switch 22 writes the multicast ID (="1") of the process group that has been set up into the setup completion notifications.

Figure 12:
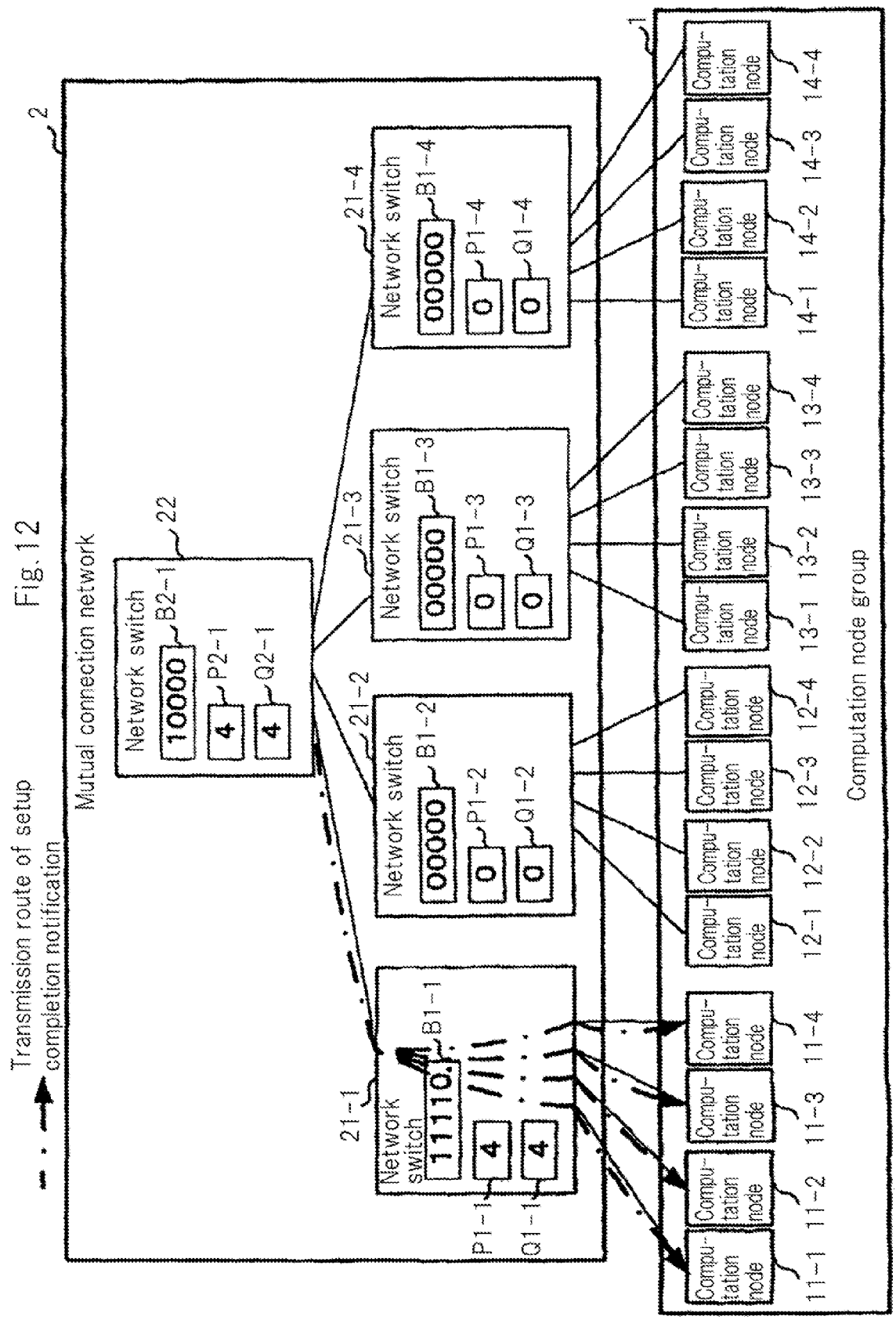
FIG. 12 is a schematic diagram showing a flow of setup completion notifications that are transmitted in the parallel computer system according to the second exemplary operation.

Then, as shown in FIG. 12, network switch 22 transmits setup completion notifications that designate computation nodes 11-1, 11-2, 11-3, and 11-4 as destinations to network switch 21-1.

Then, network switch 21-1 receives setup completion notifications transmitted from network switch 22.

Then, network switch 21-1 compares group member process count P-1 (="4") shown in FIG. 12 and stored in correlation with the multicast ID "1" contained in each setup completion notification with setup completion process count Q1-1 (="4") shown in FIG. 12 and stored in correlation with the multicast ID "1" contained in each setup completion notification.

The compared result denotes that group member process count P1-1 stored in network switch 21-1 is the same as setup completion process count Q1-1 stored in network switch 21-1.

Thus, network switch 21-1 reads bit sequence B1-1 (="11111") stored in correlation with the multicast ID "1" contained in each setup completion notification. Then, network switch 21-1 changes the value of the fifth leftmost bit corresponding to output port O5 correlated with input port I5 that has input the setup completion notification transmitted from network switch 22 of bit sequence B 1-1 from "1" to "0." When network switch 21-1 has set up this bit, bit sequence B1-1 stored in network switch 21-1 is in the state ("11110") shown in FIG. 12.

Then, network switch 21-1 transfers the setup completion notifications transmitted from network switch 22 to computation nodes 11-1 and 11-4 that are their destinations.

Then, computation nodes 11-1 to 11-4 receive the setup completion notifications transferred from network switch 21-1. Then, individual processes contained in the process group that operate in these computation nodes recognize that the multicast control switch has set up output ports that output multicast packets requested by the route setup commands. Thus, computation nodes 11-1 to 11-4 can mutually transmit multicast packets.

Next, with reference to FIG. 13, the second exemplary operation in the case in which computation nodes 11-1 to 11-4 receive setup completion notifications and then computation node 11-1 transmits a multicast packet will be described.

Figure 13:
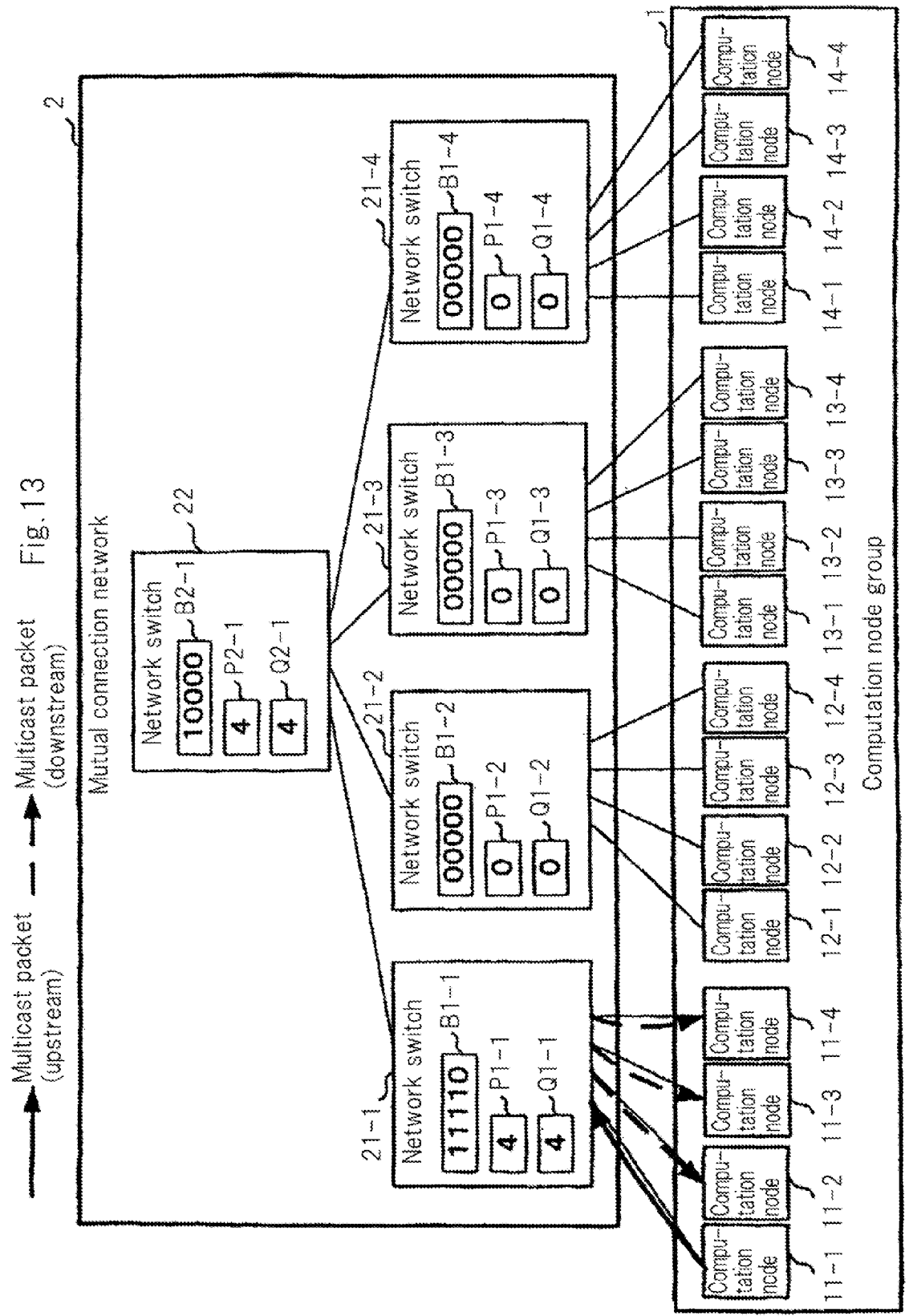
FIG. 13 is a schematic diagram showing a flow of multicast packets transmitted in the parallel computer system according to the second exemplary operation.

As shown in FIG. 13, network switch 21-1 receives a multicast packet transmitted from computation node 11-1. Then, network switch 21-1 identifies input port I1 that has input the multicast packet transmitted from computation node 11-1.

Then, network switch 21-1 outputs multicast packets to output ports other than the output port correlated with input port I1 that has been identified of output ports corresponding to bits that have been set to "1" of bit sequence B1-1 (="11110") shown in FIG. 13 and stored in correlation with the multicast ID (="1") contained in the multicast packets (in this example, output ports O2, O3, and O4).

Thus, network switch 21-1 transfers the multicast packets transmitted from computation node 11-1 to computation node 11-2 connected to output port O2, computation node 11-3 connected to output port O3, and computation node 11-4 connected to output port O4.

As described above, the parallel computer system according to the present invention can suppress the total number of multicast packets transmitted over mutual connection network 2. For example, the amount of communication packets for which multicast communications are performed according to the present invention shown in FIG. 12 is smaller than the amount of communication packets for which multicast communications are performed over the tree structure network shown in FIG. 14.

In addition, as presented in the second exemplary operation, the parallel computer system according to the present invention can prevent multicast packets from being transmitted through an unnecessary network switch and thereby the latency of multicast communications can be suppressed.

In addition, the parallel computer system according to the present invention can set up a destination and a communication route over multicast communications at high speed without necessity of grasping physical locations of computation nodes connected to mutual connection network 2.

In addition, the parallel computer system according to the present invention allows multicast packets to contain only a multicast ID along with multicast data. In other words, multicast packets do not need to contain destination information and other control information and thereby can prevent their header size from becoming large.

Besides the above-described dedicated hardware that accomplishes the processes of network switch 21-1, they may be accomplished in such a manner that a program that accomplishes the functions is recorded to a recording medium in which a computer that operates as network switch 21-1 can read, the computer is caused to read the program from the recording medium, and then the program is executed. Examples of the recording mediums readable by the computer that operates as network switch 21-1 include removable recording mediums, such as a floppy disk (registered trademark), a magneto-optical disc, a DVD, and a CD, and a computer with a build-in HDD. The program recorded to the recording medium is read by, for example, a processor that operates as multicast control section 205 with which the computer that operates as network switch 21-1 is provided and the same processes as those described above are performed under the control of the processor.

The processor that operates as multicast control section 205 executes the program read from the recording medium. Likewise, the above described program can be applied to each of network switches 21-2 to 21-4, and 22.

Now, with reference to the exemplary embodiments, the present invention has been described. However, it should be understood by those skilled in the art that the structure and details of the present invention may be changed in various manners without departing from the sprit of the present invention.

The present application claims a priority based on Japan Patent Application JP 2009-109587 filed on Apr. 28, 2009, the entire contents of which are incorporated herein by reference in its entirety.

DESCRIPTION OF REFERENCE NUMERALS

1 Computation node group
1-1 to 11-4, 12-1 to 12-4, 13-1 to 13-4, 14-1 to 14-4 Computation node
2 Mutual connection network
21-1 to 12-4, 22 Computation node
201-1 to 201-5 Input buffer section
202-1 to 202-5 Output buffer sections
203 Cross bar switch section
204 Cross bar control section
205 Multicast control section
301 Packet input section
302 Packet output section
303 Process count storing section
304 Counter section
305 Information management section
306 Comparison section
307 Completion notification generation section
308 Destination determination section
309 Correction section
3051 Multicast control information

What is claimed is:

1. A network switch that has a plurality of input ports and a plurality of output ports correlated with the input ports and that outputs multicast packets from said output ports, comprising:
   a multicast control information storing section that stores multicast control information that is information that designates an output port that outputs said multicast packet from said plurality of output ports; and
   a multicast control section that causes said multicast control information storing section to set up a transfer route for transferring said multicast packet,
   wherein said multicast control section designates an output port correlated with an input port that has received a route setup command that causes the network switch to set up a transfer route and an output port that outputs the route setup command as output ports that transfer said multicast packet such that the route setup command reaches a destination designated by the route setup command when the multicast control section receives the route setup command and the multicast control section outputs the multicast packets to output ports other than the output port correlated with the input port that has received the multicast packet of the output ports designated by the multicast control information stored in said multicast control information storing section when said multicast control section receives the multicast packet.

2. The network switch as set forth in claim 1, comprising:
   a completion notification generation section that generates a route setup completion notification that denotes that a route has been set up; and
   a destination match determination section that determines whether or not a destination represented by destination information contained in said route setup command matches the network switch that has input the route setup command when the route setup command is input to said input port, wherein when said destination match determination section determines that the destination matches the network switch, after the route has been set, said completion notification generation section generates said route setup completion notification, and outputs the generated route setup completion notification to an output port designated by multicast control information stored in said multicast control information storing section.

3. The network switch as set forth in claim 2,
wherein the route setup completion notifications are output to output ports other than the output port correlated with the input port that has received the route setup completion notification of the output ports designated by the multicast control information stored in said multicast control information storing section when said route setup completion notification is input to one input port.

4. The network switch as set forth in claim 3, comprising:
a process counter section that obtains a route setup completion process count that is the number of processes that said multicast control section has set up in said transfer route;
a comparison section that compares whether or not the route setup completion process count that said process counter section has obtained matches a group member process count that is the number of processes that join multicast communications; and
a multicast information correction section that corrects the multicast control information stored in said multicast control information storing section such that the multicast packet is not output to an output port correlated with an input port that has received said route setup completion notification when said route setup completion notification is received and said comparison section determines that the route setup completion process count matches the group member process count.

5. The network switch as set forth in claim 3, comprising:
a process counter section that obtains a route setup completion process count that is the number of processes that said multicast control section has set up in said transfer route;
a comparison section that compares whether or not the route setup completion process count that said process counter section has obtained matches a group member process count that is the number of processes that join multicast communications; and
a multicast information correction section that corrects the multicast control information stored in said multicast control information storing section such that the multicast packet is not output to an output port that outputs said route setup command and the route setup command reaches a destination designated by the route setup command when the route setup command is received and said comparison section determines that the route setup completion process count matches the group member process count.

6. The network switch as set forth in claim 4,
wherein said process counter and section obtains said route setup completion process count when said route setup command is input to said input port.

7. The network switch as set forth in claim 1,
wherein said multicast control information storing section stores multicast control information containing a plurality of bits corresponding to said plurality of output ports, and
wherein when values of said bits are updated, output ports corresponding to the updated bits are designated as output ports that output said multicast packets.

8. The network switch as set forth in claim 7,
wherein said multicast control information storing section designates multicast control information containing bits to be updated with a multicast ID that is identification information that identifies multicast communications.

9. A multicast route setup method for a network switch that has a plurality of input ports and a plurality of output ports correlated with the input ports and that outputs multicast packets from said output ports, comprising:
a multicast control information storing process that stores multicast control information that is information that designates an output port that outputs said multicast packet from said plurality of output ports;
a multicast control process that causes said multicast control information storing process to set up a transfer route of said multicast packet, said multicast control process designating an output port correlated with an input port that has received a route setup command that causes the network switch to set up a transfer route and an output port that outputs the route setup command as output ports that transfer said multicast packet such that the route setup command reaches a destination designated by the route setup command when the network switch receives the route setup command; and
a multicast transfer process that outputs the multicast packets to output ports other than the output port correlated with the input port that has received the multicast packet of the output ports designated by the multicast control information stored in said multicast control information storing process when the network switch receives the multicast packet.

10. The multicast route setup method as set forth in claim 9, comprising:
a completion notification generation process that generates a route setup completion notification that denotes that a route has been set up; and
a destination match determination process that determines whether or not a destination represented by destination information contained in said route setup command matches the network switch that has input the route setup command when the route setup command is input to said input port,
wherein when said destination match determination process determines that the destination matches the network switch, after the route has been set, said completion notification generation process generates said route setup completion notification, and
wherein the generated route setup completion notification is output to an output port designated by multicast control information stored in said multicast control information storing process.

11. The route setup method as set forth in claim 10,
wherein the route setup completion notifications are output to output ports other than the output port correlated with the input port that has received the route setup completion notification of the output ports designated by the multicast control information stored in said multicast control information storing process when said route setup completion notification is input to one input port.

12. The route setup method as set forth in claim 11, comprising:
a process count process that obtains a route setup completion process count that is the number of processes that said multicast control section has set up in said transfer route;
a comparison process that compares whether or not the route setup completion process count that said process count process has obtained matches a group member process count that is the number of processes that joins multicast communications; and a multicast information correction process that corrects the multicast control information stored in said multicast control information storing process such that the multicast packet is not output to an output port correlated with an input port that has received said route setup completion notification when said route setup completion notification is received and said comparison process determines that the route setup completion process count matches the group member process count.

13. The route setup method as set forth in claim 9, comprising:

a process count process that obtains a route setup completion process count that is the number of processes that said multicast control section has set up in said transfer route;

a comparison process that compares whether or not the route setup completion process count that said process count process has obtained matches a group member process count that is the number of processes that join multicast communications; and a multicast information correction process that corrects the multicast control information stored in said multicast control information storing process such that the multicast packet is not output to an output port that outputs said route setup command and the route setup command reaches a destination designated by the route setup command when the route setup command is received and said comparison process determines that the route setup completion process count matches the group member process count.

14. The route setup method as set forth in claim 12, wherein said process count process obtains said route setup completion process count when said route setup command is input to said input port.

15. The route setup method as set forth in claims 9, wherein said multicast control information storing process stores multicast control information containing a plurality of bits corresponding to said plurality of output ports, and wherein when values of said bits are updated, output ports corresponding to the updated bits are designated as output ports that output said multicast packets.

16. The route setup method as set forth in claim 15, wherein said multicast control information storing process designates multicast control information containing bits to be updated with a multicast ID that is identification information that identifies multicast communications.

17. A non-transitory computer-readable recording medium storing therein a program for enabling said computer to execute: a multicast control information storing procedure that stores multicast control information that is information that designates an output port that outputs a multicast packet from a plurality of output ports, a network switch that has a plurality of input ports and said plurality of output ports correlated with the input ports; a multicast control procedure that causes said multicast control information storing procedure to set up a transfer route of said multicast packet, said multicast control procedure designating an output port correlated with an input port that has received a route setup command that causes the network switch to set up a transfer route and an output port that outputs the route setup command as output ports that transfer said multicast packet such that the route setup command reaches a destination designated by the route setup command when the network switch receives the route setup command; and a multicast transfer procedure that outputs the multicast packets to output ports other than the output port correlated with the input port that has received the multicast packet of the output ports designated by the multicast control information stored in said multicast control information storing procedure when the network switch receives the multicast packet.

18. The non-transitory computer-readable recording medium as set forth in claim 17, wherein said program further enables said computer to execute: a completion notification generation procedure that generates a route setup completion notification that denotes that a route has been set up; and a destination match determination procedure that determines whether or not a destination represented by destination information contained in said route setup command matches the network switch that has input the route setup command when the route setup command is input to said input port, wherein when said destination match determination procedure determines that the destination matches the network switch, after the route has been set, said completion notification generation procedure generates said route setup completion notification, and wherein the generated route setup completion notification is output to an output port designated by multicast control information stored in said multicast control information storing procedure.

19. The non-transitory computer-readable recording medium as set forth in claim 18, wherein said program further enables said computer to execute: the route setup completion notifications are output to output ports other than the output port correlated with the input port that has received the route setup completion notification of the output ports designated by the multicast control information stored in said multicast control information storing procedure when said route setup completion notification is input to one input port.

20. The non-transitory computer-readable recording medium as set forth in claim 19, wherein said program further enables said computer to execute: a process count procedure that obtains a route setup completion process count that is the number of processes that said multicast control section has set up in said transfer route; a comparison procedure that compares whether or not the route setup completion process count that said process count procedure has obtained matches a group member process count that is the number of processes that join multicast communications; and a multicast information correction procedure that corrects the multicast control information stored in said multicast control information storing procedure such that the multicast packet is not output to an output port correlated with an input port that has received said route setup completion notification when said route setup completion notification is received and said comparison procedure determines that the route setup completion process count matches the group member process count.

21. The non-transitory computer-readable recording medium as set forth in claim 17, wherein said program further enables said computer to execute: a process count procedure that obtains a route setup completion process count that is the number of processes that said multicast control section has set up said transfer route; a comparison procedure that compares whether or not the route setup completion process count that said process count procedure has obtained matches a group member process count that is the number of processes that join multicast communications; and a multicast information correction procedure that corrects the multicast control information stored in said multicast control information storing procedure such that the multicast packet is not output to an output port that outputs said route setup command and the route setup command reaches a destination designated by the route setup command when the route setup command is received and said comparison procedure determines that the route setup completion process count matches the group member process count.

22. The non-transitory computer-readable recording medium as set forth in claim 20, wherein said process count procedure obtains said route setup completion process count when said route setup command is input to said input port.

23. The non-transitory computer-readable recording medium as set forth in claim 17, wherein said multicast control information storing procedure stores multicast control information containing a plurality of bits corresponding to said plurality of output ports, and wherein when values of said bits are updated, output ports corresponding to the updated bits are designated as output ports that output said multicast packets.

24. The non-transitory computer-readable recording medium as set forth in claim 23, wherein said multicast control information storing procedure designates multicast control information containing bits to be updated with a multicast ID that is identification information that identifies multicast communications.

25. A parallel computer system in which a plurality of computation nodes are connected by a mutual connection network,
   wherein said mutual connection network is composed of a network switch as set forth in a claim 1, and
   wherein a multicast communication activity is provided between said plurality of computation nodes.

\* \* \* \* \*